US010852713B2

(12) United States Patent
Koga et al.

(10) Patent No.: US 10,852,713 B2
(45) Date of Patent: Dec. 1, 2020

(54) INDUSTRIAL COMMUNICATION SYSTEM, INDUSTRIAL INSTRUMENT, AND INDUSTRIAL COMMUNICATION METHOD

(71) Applicant: KABUSHIKI KAISHA YASKAWA DENKI, Kitakyushu (JP)

(72) Inventors: Hidetsugu Koga, Kitakyushu (JP); Isamu Matsumura, Kitakyushu (JP); Tomofumi Nishiyama, Kitakyushu (JP)

(73) Assignee: KABUSHIKI KAISHA YASHAWA DENKI, Kitakyushu (JP)

( * ) Notice: Subject to any disclaimer, the term of this patent is extended or adjusted under 35 U.S.C. 154(b) by 55 days.

(21) Appl. No.: 16/118,499

(22) Filed: Aug. 31, 2018

(65) Prior Publication Data
US 2019/0079501 A1 Mar. 14, 2019

(30) Foreign Application Priority Data
Sep. 8, 2017 (JP) ................................. 2017-172658

(51) Int. Cl.
*G05B 19/418* (2006.01)
*H04Q 9/02* (2006.01)
*G01D 21/00* (2006.01)

(52) U.S. Cl.
CPC ....... *G05B 19/41835* (2013.01); *G01D 21/00* (2013.01); *H04Q 9/02* (2013.01);
(Continued)

(58) Field of Classification Search
CPC .... G05B 19/41835; G05B 2219/34213; G05B 2219/34433; G01D 21/00; H04Q 9/02; H04Q 2209/10; H04Q 2209/30
See application file for complete search history.

(56) References Cited

U.S. PATENT DOCUMENTS 5,990,638 A * 11/1999 Aoyama ............ G05B 19/4141
318/562
2002/0010520 A1 1/2002 Matsubara et al.
(Continued)

FOREIGN PATENT DOCUMENTS

| JP | 10-105206 A | 4/1998 |
| JP | 2011-119999 A | 6/2011 |
| WO | WO 2016/042636 A1 | 3/2016 |

OTHER PUBLICATIONS

Extended European Search Report dated Feb. 22, 2019 in Patent Application No. 18192391.3, 9 pages.
(Continued)

*Primary Examiner* — Amine Benlagsir
(74) *Attorney, Agent, or Firm* — Oblon, McClelland, Maier & Neustadt, L.L.P.

(57) ABSTRACT

An industrial communication system includes multiple industrial instruments connected in series and including a first industrial instrument and a second industrial instrument connected to the first industrial instrument. The first industrial instrument includes a first storage that stores a first communication setting that is applicable to communication established between the industrial instruments, first reception circuitry that receives, based on the first communication setting stored in the first storage, a first signal from the second industrial instrument of the industrial instruments, a second storage that stores a second communication setting that is applicable to the communication established between the industrial instruments and that is a predetermined communication setting common to each of the industrial instruments, and second reception circuitry that receives, based on the second communication setting stored in the second storage, a second signal including at least a part of the first signal received by the first reception circuitry.

20 Claims, 10 Drawing Sheets

(52) U.S. Cl.
CPC .............. *G05B 2219/34213* (2013.01); *G05B 2219/34433* (2013.01); *H04Q 2209/10* (2013.01); *H04Q 2209/30* (2013.01)

(56) References Cited

U.S. PATENT DOCUMENTS

| | | | | |
|---|---|---|---|---|
| 2004/0195992 | A1* | 10/2004 | Shimizu | G05B 23/0235 |
| | | | | 318/801 |
| 2017/0070382 | A1* | 3/2017 | You | H04L 12/40176 |
| 2017/0193817 | A1* | 7/2017 | Ogawa | G08C 19/20 |
| 2018/0278352 | A1* | 9/2018 | Hoshino | H04J 3/0673 |

OTHER PUBLICATIONS

Office Action dated Aug. 28, 2020 in corresponding European Patent Application No. 18 192 391.3.

* cited by examiner

S202: Is command signal an initialization command signal?
S206: Is command signal an initialization command signal?

INDUSTRIAL COMMUNICATION SYSTEM, INDUSTRIAL INSTRUMENT, AND INDUSTRIAL COMMUNICATION METHOD

CROSS-REFERENCE TO RELATED APPLICATIONS

The present application claims priority under 35 U.S.C. § 119 to Japanese Patent Application No. 2017-172658, filed Sep. 8, 2017. The contents of this application are incorporated herein by reference in their entirety.

BACKGROUND

Field of the Invention

The embodiments disclosed herein relate to an industrial communication system, an industrial instrument, and an industrial communication method.

Discussion of the Background

WO/2016/042636 discloses an industrial communication system that includes a plurality of industrial instruments connected in series to each other. In this industrial communication system, identical communication settings are used between the industrial instruments, enabling the industrial instruments to communicate with each other.

SUMMARY

According to one aspect of the present invention, an industrial communication system includes multiple industrial instruments connected in series and including a first industrial instrument and a second industrial instrument connected to the first industrial instrument. The first industrial instrument includes a first storage that stores a first communication setting that is applicable to communication established between the industrial instruments, first reception circuitry that receives, based on the first communication setting stored in the first storage, a first signal from the second industrial instrument of the industrial instruments, a second storage that stores a second communication setting that is applicable to the communication established between the industrial instruments and that is a predetermined communication setting common to each of the industrial instruments, and second reception circuitry that receives, based on the second communication setting stored in the second storage, a second signal including at least a part of the first signal received by the first reception circuitry.

According to another aspect of the present invention, an industrial instrument of industrial instruments connected in series includes a first storage that stores a first communication setting that is applicable to communication established between the industrial instruments, first reception circuitry that receives, based on the first communication setting stored in the first storage, a first signal from a second industrial instrument of the industrial instruments that is connected to the industrial instrument, a second storage that stores a second communication setting that is applicable to the communication established between the industrial instruments and that is a predetermined communication setting common to each of the industrial instruments, and second reception circuitry that receives, based on the second communication setting stored in the second storage, a second signal including at least a part of the first signal received by the first reception circuitry.

According to the other aspect of the present disclosure, an industrial communication method for a first industrial instrument of industrial instruments connected in series includes storing a first communication setting that is applicable to communication established between the industrial instruments, storing a second communication setting that is applicable to the communication established between the industrial instruments and that is a predetermined communication setting common to each of the industrial instruments, controlling first reception circuitry located in the first industrial instrument to receive, based on the first communication setting, a first signal from a second industrial instrument that is connected to the first industrial instrument, and controlling second reception circuitry located in the first industrial instrument to receive, based on the second communication setting, a second signal including at least a part of the first signal received by the first reception circuitry.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
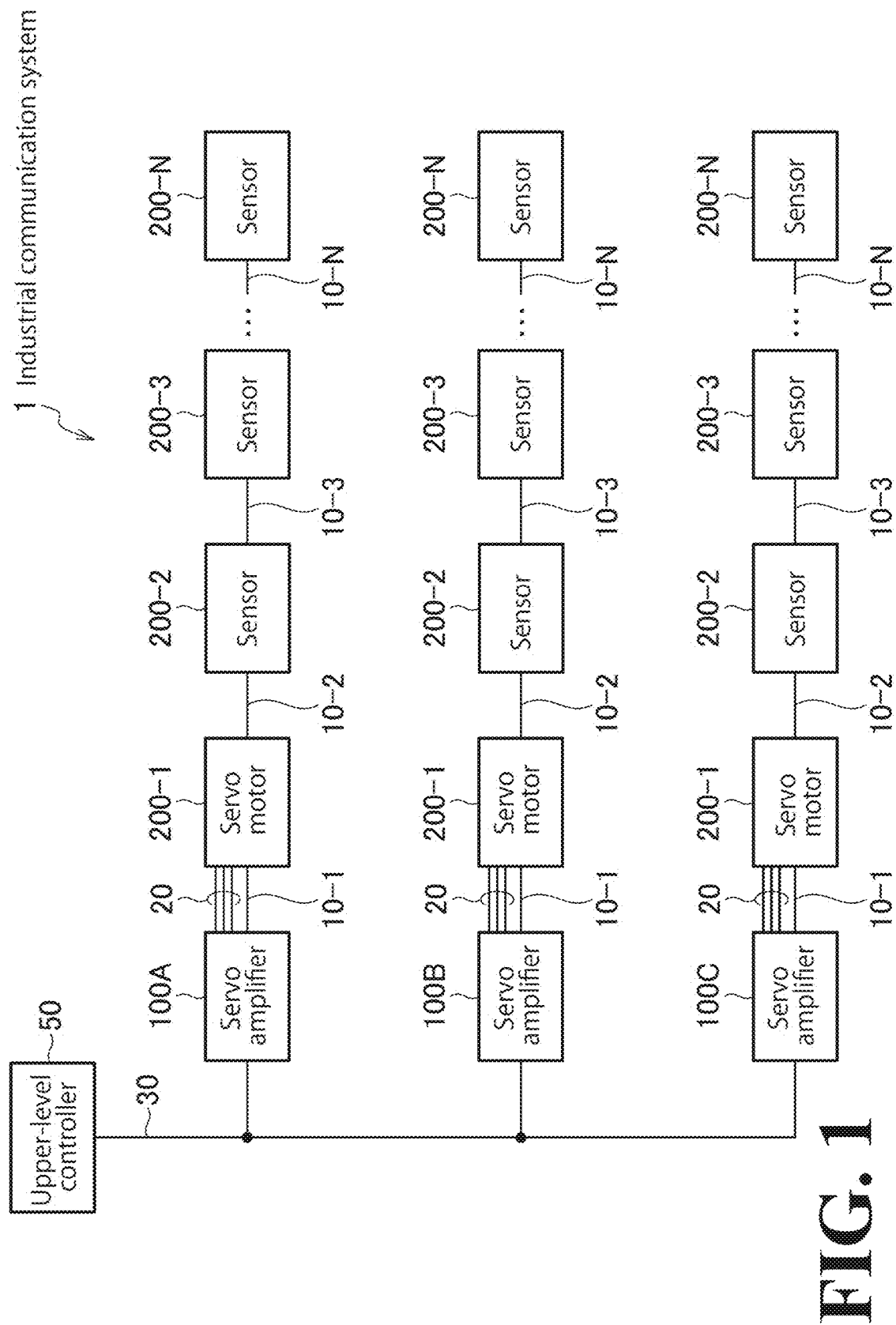
FIG. 1 is a diagram illustrating a schematic configuration of an industrial communication system according to an embodiment.

The embodiments will now be described with reference to the accompanying drawings, wherein like reference numerals designate corresponding or identical elements throughout the various drawings.

(1) Outline of Industrial Communication System

An industrial communication system according to an embodiment will be outlined. FIG. 1 illustrates a general arrangement of an industrial communication system 1 according to this embodiment.

As illustrated in FIG. 1, the industrial communication system 1 includes an upper-level controller 50 and three servo amplifiers 100A to 100C. The three servo amplifiers 100A to 100C are connected to the upper-level controller 50 through a signal line 30. In the following description, the servo amplifiers 100A to 100C will be simply referred to as "servo amplifier 100" or "servo amplifiers 100" in contexts where the servo amplifiers 100A to 100C need not be distinguished from each other. The number of servo amplifiers 100 connected to the upper-level controller 50 will not be limited to three, but may be two, four, or more than four. The upper-level controller 50 makes commands to the servo amplifiers 100 through the signal line 30. The upper-level controller 50 may be a Programmable Logic Controller (PLC).

To the servo amplifiers 100, a plurality of slave instruments 200-1 to 200-N (N: an integer of two or more) are connected in series. Specifically, servo motors 200-1 are connected to the servo amplifiers 100 through signal lines 10-1 and power source lines 20. To each of the servo motors 200-1, a sensor 200-2 is connected through a signal line 10-2. To the sensor 200-2, a sensor 200-3 is connected through a signal line 10-3. This series type of connection is occasionally referred to as daisy-chain type of connection. The series type of connection ensures a wiring-saved configuration as compared with other types of connection such as star type of connection. In the following description, the signal lines 10-1 to 10-N will be simply referred to as "signal line 10" or "signal lines 10" in contexts where the signal lines 10-1 to 10-N need not be distinguished from each other. Also in the following description, the servo motors 200-1 and the sensors 200-2 to 200-N will be simply referred to as "slave instrument 200" or "slave instruments 200" in contexts where the servo motors 200-1 and the sensors 200-2 to 200-N need not be distinguished from each other.

Each servo amplifier 100 controls the servo motor 200-1 based on a command from the upper-level controller 50. The servo amplifier 100 is a non-limiting example of the master instrument recited in the appended claims. The servo amplifier 100 performs power conversion of frequency, current, voltage, and other variables by switching operations of semiconductor switches. Specifically, the servo amplifier 100 converts power from a commercial alternating-current (AC) power source or a commercial direct-current (DC) power source into variable frequency three-phase AC, and supplies the resulting AC power (driving power) to the servo motor 200-1 through the power source lines 20.

The servo motor 200-1 includes an encoder. The encoder detects at least one of the rotation speed and rotation position (rotation angle) of the rotation axis of the servo motor 200-1. Examples of the sensors 200-2 to 200-N include, but are not limited to, a torque sensor, a pressure sensor, and a temperature sensor. Through the signal lines 10, the servo amplifier 100 obtains a detection value obtained by the encoder of the servo motor 200-1 and obtains detection values obtained by the sensors 200-2 to 200-N. Then, based on the obtained detection values, the servo amplifier 100 supplies driving power to the servo motor 200-1 through the power source lines 20. The servo motor 200-1 may be incorporated in a multi-axis machine. The multi-axis machine may be an industrial robot. The multi-axis machine includes a number of axes corresponding to the number of the servo motors 200-1, and operate on the servo motors 200-1 as motive power sources.

Figure 2:
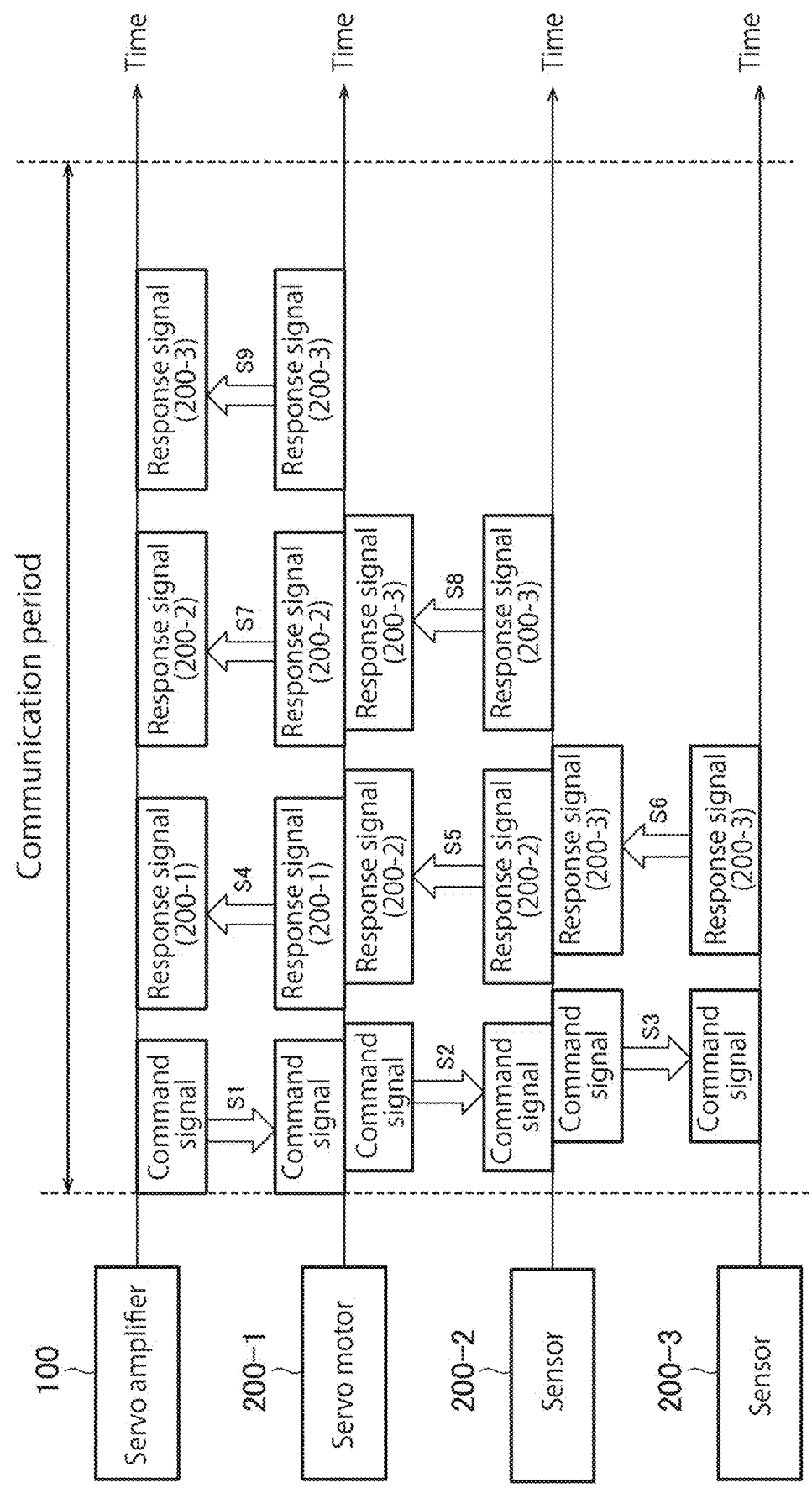
FIG. 2 is a time chart illustrating an example of how the industrial communication system according to the embodiment operates during communication.

FIG. 2 is a time chart illustrating an example of how the industrial communication system 1 operates during communication. FIG. 2 is under this assumption that the number of sensors is two.

As illustrated in FIG. 2, the servo amplifier 100 communicates with the slave instruments 200 on a predetermined-communication-period basis. The servo amplifier 100 generates a command signal to obtain a detection value obtained by the encoder of the servo motor 200-1 and detection values obtained by the sensors 200-2 and 200-3, and transmits the command signal to the servo motor 200-1 (step S1). The command signal from the servo amplifier 100 is forwarded from the servo motor 200-1 toward the sensor 200-3. Specifically, the command signal from the servo amplifier 100 is forwarded by the servo motor 200-1 to the sensor 200-2 (step S2), and then forwarded by the sensor 200-2 to the sensor 200-3 (step S3).

Next, the servo motor 200-1 transmits a response signal including the detection value obtained by the encoder to the servo amplifier 100 (step S4). The sensor 200-2 transmits a response signal including the detection value obtained by the sensor 200-2 to the servo motor 200-1 (step S5). The sensor 200-3 transmits a response signal including the detection value obtained by the sensor 200-3 to the sensor 200-2 (step S6).

Next, the response signal from the sensor 200-2 is forwarded by the servo motor 200-1 to the servo amplifier 100 (step S7). The response signal from the sensor 200-3 is forwarded by the sensor 200-2 to the servo motor 200-1 (step S8), and then forwarded by the servo motor 200-1 to the servo amplifier 100 (step S9).

The servo amplifier 100 communicates with the slave instruments 200 on a predetermined-communication-period basis. The servo amplifier 100 communicates with the plurality of slave instruments 200 for a predetermined period of time to periodically obtain detection values from the slave instruments 200. In the following description, such communication established for a predetermined period of time will be referred to as "fixed-period communication". As the number of slave instruments 200 increases, however, the communication established between the servo amplifier 100 and the slave instruments 200 may not necessarily end within a communication period. In this case, it is necessary to increase the communication speed of the communication established between the servo amplifier 100 and the slave instruments 200.

In this embodiment, a transmission system referred to as baseband transmission is used to transmit and receive signals such as command signals and response signals on wired transmission paths (signal lines 10). Baseband transmission is a system that transmits digital signals in their baseband state, without modulating the digital signals. In baseband transmission, transmission path coding is used to convert a digital signal into a pulse waveform, which is then made to flow through wired transmission paths. Examples of transmission path coding include, but are not limited to, Manchester coding and non-return-to-zero (NRZ) coding. In order to increase communication speed in baseband transmission, it is necessary to increase frequencies (that is, clock frequencies) of pulse waveforms flowing through wired transmission paths. Increasing communication speed involves change in transmission path codes. A Manchester code changes, rises or falls, at least once in one period (bit interval) of a clock, making clock extraction easy at the reception side. In contrast, a NRZ code shows no change, rising or falling, in a situation in which one value continues, making clock extraction difficult at the reception side.

The servo amplifier 100 and the slave instruments 200 store currently-applied communication settings (such as communication speed and transmission path coding), and transmit and receive signals on the wired transmission paths based on the communication settings. When communication speed is increased, the servo amplifier 100 transmits a command signal instructing change in a communication setting (specifically, increase in communication speed) to the slave instruments 200. In response to the command signal, the slave instruments 200 change the respective communication settings, and transmit and receive signals on the wired transmission paths based on the post-change communication settings.

If a problem occurs in any of the slave instruments 200 and the signal lines 10 after communication setting has been changed by the servo amplifier 100, it is common practice to turn off a particular slave instrument 200 to inspect and/or repair the particular slave instrument 200 or replace the particular slave instrument 200. In this case, after the particular slave instrument 200 has been inspected, repaired, replaced, or subjected to other maintenance-related work, the communication setting of the particular slave instrument 200 turns into an unchanged state in which the change implemented by the servo amplifier 100 is not reflected (an example of this state is initial communication setting). In contrast, the communication settings of the other slave instruments 200 remain in a changed state in which the change implemented by the servo amplifier 100 is reflected. Thus, there is a discrepancy between the communication setting of the particular slave instrument 200 and the communication settings of the other slave instruments 200. Referring to FIG. 1, assume that the sensor 200-2 is replaced after the communication settings of the servo motor 200-1 and the sensors 200-2 to 200-3 have been changed by the servo amplifier 100. In this case, the communication setting of the replaced sensor 200-2 is in an unchanged state in which the change implemented by the servo amplifier 100 is not reflected. In contrast, the communication settings of the servo motors 200-1 and the sensors 200-3 to 200-N are in a changed state in which the change implemented by the servo amplifier 100 is reflected. In this situation, if the servo amplifier 100 transmits a command signal based on the post-change communication settings, the sensor 200-2 is unable to receive the command signal transmitted from the servo motor 200-1 or forward the command signal to the sensor 200-3. As a result, the servo amplifier 100 is not only unable to communicate with the sensor 200-2 but also unable to communicate with the sensors 200-3 to 200-N.

Description will be made below with regard to a configuration and an operation of an industrial communication system that enables industrial instruments to communicate with each other with improved efficiency even in a situation in which different communication settings are used in the industrial instruments.

(2) Hardware Configuration of Industrial Communication System

A hardware configuration of the industrial communication system 1 will be described. In the following description, the power source lines 20 and related configurations will not be elaborated upon.

(2.1) Hardware Configuration of Servo Amplifier

Figure 3:
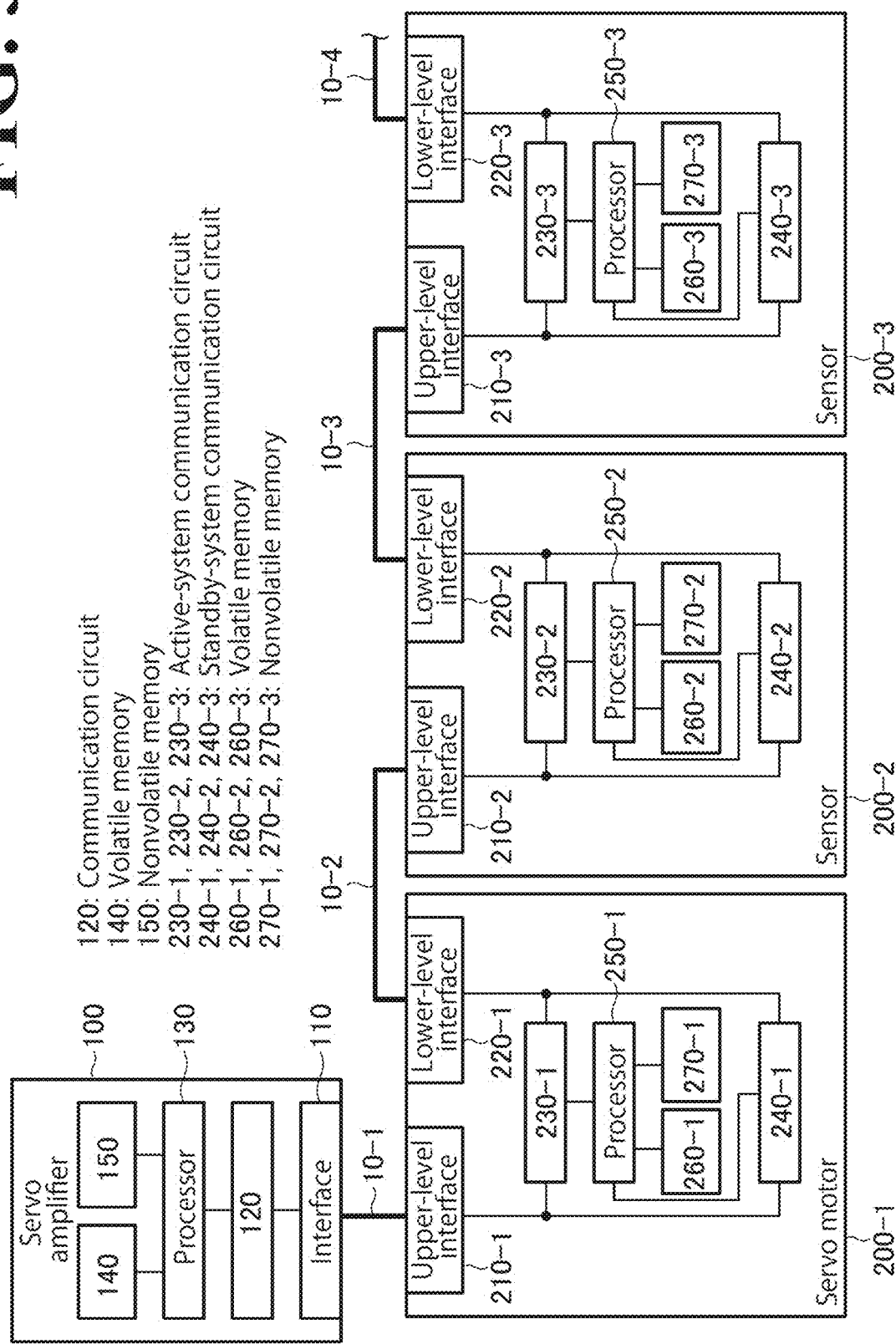
FIG. 3 is a diagram illustrating a hardware configuration of the industrial communication system according to the embodiment.

FIG. 3 is a diagram illustrating a hardware configuration of the industrial communication system 1 according to the embodiment. As illustrated in FIG. 3, the servo amplifier 100 includes an interface 110, a communication circuit 120, a processor 130, a volatile memory 140, and a nonvolatile memory 150.

The interface 110 is an interface that communicates with external devices, apparatuses, machines, and/or instruments. To the interface 110, the signal line 10-1 is connected. Through the signal line 10-1, the interface 110 is connected to the servo motor 200-1, which is the uppermost-level slave instrument. As used herein, the term "upper-level" refers to a side closer to the servo amplifier 100, and the term "lower-level" refers to a side further away from the servo amplifier 100.

The communication circuit 120 is connected to the interface 110. The communication circuit 120 is a circuit that transmits and receives signals by baseband transmission on the wired transmission path through the interface 110. The communication circuit 120 is capable of dealing with a plurality of communication settings (such as communication speed and transmission path coding).

The processor 130 is connected to the communication circuit 120. Examples of the processor 130 include, but are not limited to, a micro-controller and a field-programmable gate array (FPGA). The processor 130 may execute a program stored in the nonvolatile memory 150 to perform processing corresponding to the program. In this case, the processor 130 may use the volatile memory 140 as a work area. The volatile memory 140 and the nonvolatile memory 150 is connected to the processor 130. A non-limiting example of the volatile memory 140 is a random access memory (RAM). Examples of the nonvolatile memory 150 include, but are not limited to, a read only memory (ROM), an electrically erasable programmable read only memory (EEPROM), and a flash memory.

The communication circuit 120 may be integrated on one chip as an application specific integrated circuit (ASIC). In addition to the communication circuit 120, at least one of the processor 130, the volatile memory 140, and the nonvolatile memory 150 may be integrated on one chip.

(2.2) Hardware Configuration of Slave Instrument

Next, a hardware configuration of the servo motor 200-1, which is a representative slave instrument 200, will be described. As illustrated in FIG. 3, the servo motor 200-1 includes an upper-level interface 210-1, a lower-level interface 220-1, an active-system communication circuit 230-1, a standby-system communication circuit 240-1, a processor 250-1, a volatile memory 260-1, and a nonvolatile memory 270-1.

The upper-level interface 210-1 is an interface that communicates with the upper-level industrial instrument. To the interface 210-1, the signal line 10-1 is connected. Through the signal line 10-1, the interface 210-1 is connected to the servo amplifier 100.

The lower-level interface 220-1 is an interface that communicates with the lower-level industrial instrument. To the interface 220-1, the signal line 10-2 is connected. Through the signal line 10-2, the lower-level interface 220-1 is connected to the lower-level sensor 200-2.

The active-system communication circuit 230-1 is connected to the upper-level interface 210-1 and the lower-level interface 220-1. The active-system communication circuit 230-1 is a circuit that transmits and receives signals by baseband transmission on the wired transmission path. The active-system communication circuit 230-1 is capable of dealing with a plurality of communication settings.

The standby-system communication circuit 240-1 is connected to the upper-level interface 210-1 and the lower-level interface 220-1. The standby-system communication circuit 240-1 is a circuit that transmits and receives signals by baseband transmission on the wired transmission path. The standby-system communication circuit 240-1 deals with a limited communication setting(s). The number of communication settings that the standby-system communication circuit 240-1 deals with may be one. With this configuration, the standby-system communication circuit 240-1 may have a circuit size smaller than the circuit size of the active-system communication circuit 230-1.

The processor 250-1 is connected to the active-system communication circuit 230-1 and the standby-system communication circuit 240-1. Examples of the processor 250-1 include, but are not limited to, a micro-controller and an FPGA. The processor 250-1 may execute a program stored in the nonvolatile memory 270-1 to perform processing corresponding to the program. In this case, the processor 250-1 may use the volatile memory 260-1 as a work area. The volatile memory 260-1 and the nonvolatile memory 270-1 are connected to the processor 250-1. A non-limiting example of the volatile memory 260-1 is a RAM. Examples of the nonvolatile memory 270-1 include, but are not limited to, a ROM, an EEPROM, and a flash memory.

The active-system communication circuit 230-1 and the standby-system communication circuit 240-1 may be integrated on one chip as an ASIC. In addition to the active-system communication circuit 230-1 and the standby-system communication circuit 240-1, at least one of the processor 250-1, the volatile memory 260-1, and the nonvolatile memory 270-1 may be integrated on one chip.

(3) Functional Block Configuration of Industrial Communication System

Figure 4:
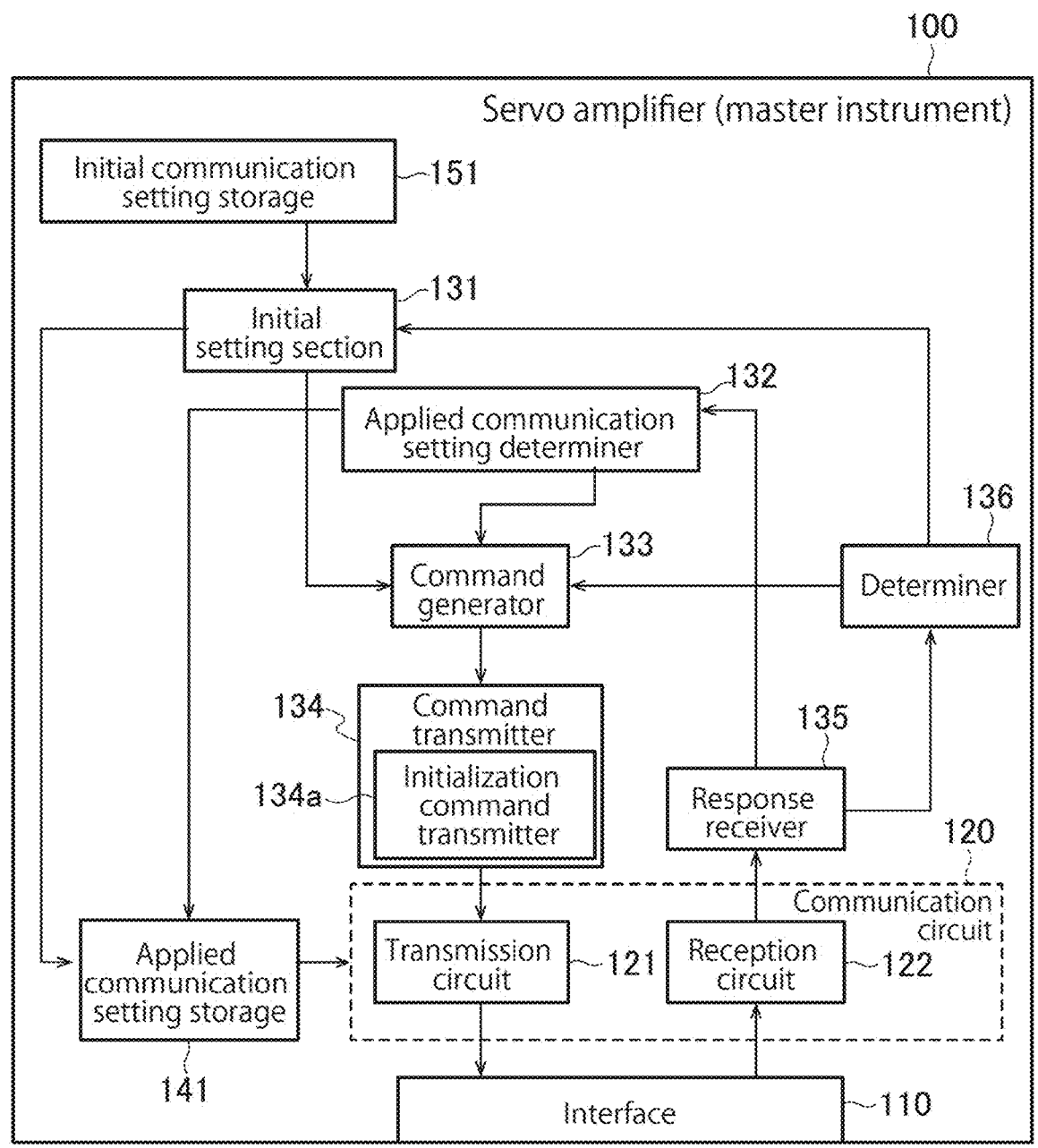
FIG. 4 is a diagram illustrating a functional block configuration of a master instrument (servo amplifier) according to the embodiment.

Next, a functional block configuration of the industrial communication system 1 will be described.
(3.1) Functional Block Configuration of Servo Amplifier FIG. 4 is a diagram illustrating a functional block configuration of the servo amplifier 100. As illustrated in FIG. 4, the servo amplifier 100 includes the interface 110, the communication circuit 120, an initial setting section 131, an applied communication setting determiner 132, a command generator 133, a command transmitter 134, a response receiver 135, a determiner 136, an applied communication setting storage 141, and an initial communication setting storage 151. The interface 110 is connected to the servo motors 200-1. The communication circuit 120 includes a transmission circuit 121 and a reception circuit 122.

The initial communication setting storage 151 stores an initial communication setting. The initial communication setting is a non-limiting example of the second communication setting recited in the appended claims. The initial communication setting storage 151 is a part of the nonvolatile memory 150. At the time of production of the servo amplifier 100, an initial communication setting is written in the initial communication setting storage 151. The initial communication setting is a predetermined communication setting common to a plurality of industrial instruments. Alternatively, it is possible for a user who bought the servo amplifier 100 to write the predetermined communication setting, as the initial communication setting, in the initial communication setting storage 151.

Upon activation of the servo amplifier 100, the initial setting section 131 reads the initial communication setting from the initial communication setting storage 151, and writes the obtained initial communication setting in the applied communication setting storage 141. Upon activation of the servo amplifier 100, the applied communication setting storage 141 stores the initial communication setting written by the initial setting section 131. The applied communication setting storage 141 is a part of the volatile memory 140. Alternatively, the applied communication setting storage 141 may be a part of the communication circuit 120.

The transmission circuit 121 of the communication circuit 120 transmits a signal through the interface 110 based on a communication setting stored in the applied communication setting storage 141. The reception circuit 122 of the communication circuit 120 receives a signal through the interface 110 based on the communication setting stored in the applied communication setting storage 141. When the communication setting stored in the applied communication setting storage 141 is an initial communication setting, the communication circuit 120 transmits and receives signals based on the initial communication setting.

The applied communication setting determiner 132 determines an applied communication setting to use in fixed-period communication established between the plurality of slave instruments 200. The applied communication setting is a non-limiting example of the first communication setting recited in the appended claims. The applied communication setting determiner 132 obtains the maximum communication speeds of the respective slave instruments 200, and selects the lowest maximum communication speed from among the obtained maximum communication speeds. Alternatively, the applied communication setting determiner 132 may obtain the number of slave instruments 200 and select a communication speed based on the number of slave instruments 200. The applied communication setting determiner 132 determines, as the applied communication setting, a communication setting representing the selected maximum communication speed. The applied communication setting determined by the applied communication setting determiner 132 has a communication speed setting higher than the communication speed setting of the initial communication setting. Thus, a communication setting having a communication speed setting higher than the communication speed setting of the initial communication setting is used as the applied communication setting. This ensures that the communication speed of communication established based on the applied communication setting is higher than the communication speed of communication established based on the initial communication setting.

The command generator 133 generates a setting changing command signal instructing change to the applied communication setting determined by the applied communication setting determiner 132. The setting changing command signal includes information of the applied communication setting (such as communication speed and transmission path coding) determined by the applied communication setting determiner 132. The command transmitter 134 transmits, through the transmission circuit 121, the setting changing command signal generated by the command generator 133. The setting changing command signal is forwarded from the servo motor 200-1 toward the sensor 200-N based on an initial communication setting. The response receiver 135 receives, through the reception circuit 122, a response signal indicating change of communication setting. Upon receipt of the response signal, the applied communication setting determiner 132 substitutes the initial communication setting stored in the applied communication setting storage 141 with the applied communication setting, thereby changing the communication setting stored in the applied communication setting storage 141. When the communication setting stored in the applied communication setting storage 141 is an applied communication setting, the communication circuit 120 transmits and receives signals based on the applied communication setting.

After the communication setting stored in the applied communication setting storage 141 has been changed, fixed-period communication starts. Upon start of the fixed-period communication, the command generator 133 periodically generates a detection-value transmission command signal instructing each slave instrument 200 to transmit a detection value obtained by the encoder and a detection value obtained by the sensor. The command transmitter 134 transmits, through the transmission circuit 121, the detection-value transmission command signal generated by the command generator 133 based on the applied communication setting. The detection-value transmission command signal is forwarded from the servo motor 200-1 toward the sensor 200-N based on the applied communication setting. The response receiver 135 receives, through the reception circuit 122, a response signal including the detection values.

Based on a transmitter address included in the response signal received by the response receiver 135, the determiner 136 identifies the slave instrument 200 that transmitted the response signal. The determiner 136 receives first response signals from the plurality of slave instruments 200 in a first period, and receives second response signals from the plurality of slave instruments 200 in a second period different from the first period. Then, based on the first response signals and the second response signals, the determiner 136 determines whether the number of slave instruments 200 communicable with the servo amplifier 100 has changed. For example, the determiner 136 counts the number of slave instruments 200 that transmitted response signals. Then, in every communication period, the determiner 136 determines whether the slave instrument count in the current communication period and the slave instrument count in the previous communication period are identical to or different from each other. When the determiner 136 has determined that the number of slave instruments 200 has changed, there is a possibility of existence of a slave instrument 200 that has a different applied communication setting.

When the determiner 136 has determined that the number of slave instruments 200 communicable with the servo amplifier 100 has changed, the determiner 136 notifies the change to the initial setting section 131. Based on the notification, the initial setting section 131 reads the initial communication setting from the initial communication setting storage 151, and writes the obtained initial communication setting in the applied communication setting storage 141, thereby initializing the applied communication setting. When the initial communication setting is stored in the applied communication setting storage 141, the communication circuit 120 transmits and receives signals based on the initial communication setting. Also, the initial setting section 131 causes the command generator 133 to generate an initialization command signal instructing initialization of the applied communication setting. The initialization command signal generated by the command generator 133 is transmitted by an initialization command transmitter 134a of the command transmitter 134. Specifically, the initialization command transmitter 134a transmits, through the transmission circuit 121, the initialization command signal based on the initial communication setting. The initialization command signal is forwarded from the servo motor 200-1 toward the sensor 200-N based on the initial communication setting. As a result, the applied communication settings of the slave instruments 200 are initialized to initial communication settings.

(3.2) Functional Block Configuration of Slave Instrument

Figure 5:
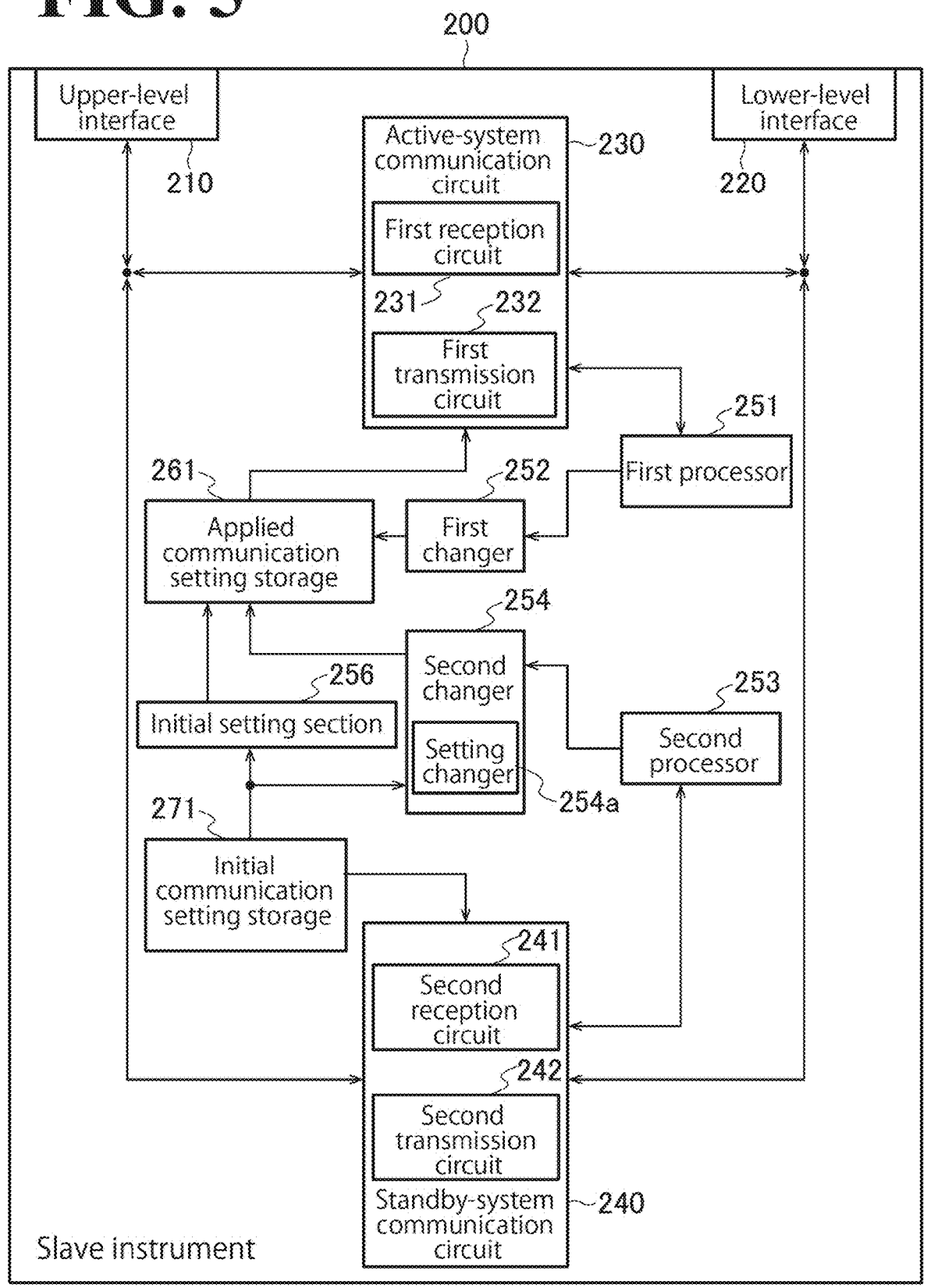
FIG. 5 is a diagram illustrating a functional block configuration of a slave instrument according to the embodiment.

FIG. 5 is a diagram illustrating a functional block configuration of the slave instrument 200. As illustrated in FIG. 5, the slave instrument 200 includes an upper-level interface 210, a lower-level interface 220, an active-system communication circuit 230, a standby-system communication circuit 240, a first processor 251, a first changer 252, a second processor 253, a second changer 254, an initial setting section 256, an applied communication setting storage 261, and an initial communication setting storage 271. The upper-level interface 210 is connected to the servo amplifier 100 or the upper-level slave instrument 200. The lower-level interface 220 is connected to the lower-level slave instrument 200.

The initial communication setting storage 271 stores an initial communication setting. The initial communication setting storage 271 is a part of the nonvolatile memory 270. At the time of production of the slave instrument 200, an initial communication setting is written in the initial communication setting storage 271. The initial communication setting is a predetermined communication setting common to a plurality of industrial instruments. Alternatively, it is possible for a user who bought the slave instrument 200 to write the predetermined communication setting, as the initial communication setting, in the initial communication setting storage 271.

Upon activation of the slave instrument 200, the initial setting section 256 reads the initial communication setting from the initial communication setting storage 271, and writes the obtained initial communication setting in the applied communication setting storage 261. Upon activation of the slave instrument 200, the applied communication setting storage 261 stores the initial communication setting written by the initial setting section 256. The applied communication setting storage 261 is a part of the volatile memory 261. Alternatively, the applied communication setting storage 261 may be a part of the active-system communication circuit 230.

Based on the communication setting stored in the applied communication setting storage 261, a first reception circuit 231 of the active-system communication circuit 230 receives a command signal input through the upper-level interface 210. Based on the applied communication setting stored in the applied communication setting storage 261, a first transmission circuit 232 of the active-system communication circuit 230 transmits the command signal received by the first reception circuit 231 to the lower-level slave instrument through the lower-level interface 220. This operation corresponds to the operation of forwarding a command signal. It will be understood by those skill in the art that when the slave instrument 200 is the lowermost-level slave instrument (sensor 200-N), the first transmission circuit 232 transmits no command signal through the lower-level interface 220.

The first processor 251 processes a signal (first signal), among the command signals received by the first reception circuit 231, other than an initialization command signal. Specifically, when the first reception circuit 231 has received a first signal, the first processor 251 performs first processing, which corresponds to the first signal received by the first reception circuit 231. The first processor 251 may be a part of the processor 250 or a part of the active-system communication circuit 230. The first processor 251 interprets the content of the command signal received by the first reception circuit 231 to determine whether this command signal is a processing target signal. When the first reception circuit 231 has received an initialization command signal, the first processor 251 may not necessarily perform processing corresponding to the initialization command signal within a predetermined period of time. For example, the first processor 251 may disregard the initialization command signal. As used herein, the term "predetermined period of time" may refer to a period of time corresponding to a communication period including signal reception timing. Alternatively, as processing corresponding to the initialization command signal, the first processor 251 may perform processing of canceling the initialization command signal. Initialization command signals are command signals intended to be processed by the second processor 253. If, therefore, the first processor 251 processes an initialization command signal, such a situation may result that both the first processor 251 and the second processor 253 can process initialization command signals. In view of the circumstances, by causing the first processor 251 to disregard or cancel initialization command signals, a processing collision between the first processor 251 and the second processor 253 is eliminated or minimized.

When, before start of fixed-period communication, the first reception circuit 231 has received a speed transmission command signal instructing transmission of the maximum communication speed of the slave instrument 200, the first processor 251 generates a response signal including information of the maximum communication speed of the slave instrument 200. The response signal including information of the maximum communication speed is transmitted by the first transmission circuit 232 through the upper-level interface 210.

Then, when the first reception circuit 231 has received a setting changing command signal instructing change to the applied communication setting determined by the servo amplifier 100, the first processor 251 inputs information (information of the designated communication setting) included in the setting changing command signal into the first changer 252.

Based on the information input from the first processor 251, the first changer 252 changes the communication setting stored in the applied communication setting storage 261, from the initial communication setting to the communication setting designated by the setting changing command signal. For example, assume that the initial communication setting stored in the applied communication setting storage 261 has a communication speed setting of V1, and the setting changing command signal designates a communication speed setting of V2. In this case, the first changer 252 changes the communication speed setting stored in the applied communication setting storage 261 to V2. Also assume that the initial communication setting stored in the applied communication setting storage 261 has a transmission path code setting represented by Manchester coding, and the setting changing command signal designates a transmission path code setting represented by NRZ coding. In this case, the first changer 252 changes the transmission path code setting stored in the applied communication setting storage 261 to NRZ coding. After the first changer 252 has changed the communication setting stored in the applied communication setting storage 261, the active-system communication circuit 230 (the first reception circuit 231 and the first transmission circuit 232) transmits and receives signals based on the post-change applied communication setting.

Then, upon start of fixed-period communication, the first reception circuit 231 receives, through the upper-level interface 210, a detection-value transmission command signal based on the applied communication setting. When the first reception circuit 231 has received the detection-value transmission command signal, the first processor 251 generates a response signal including detection values. A response signal including information of the maximum communication speed is transmitted by the first transmission circuit 232 through the upper-level interface 210.

In the standby-system communication circuit 240, a second reception circuit 241 receives a signal including at least a part of a signal input into the first reception circuit 231. The second reception circuit 241 receives the signal based on the initial communication setting stored in the initial communication setting storage 271. For example, a command signal input into the first reception circuit 231 is duplicated, and the duplicate command signal is input into the second reception circuit 241. When the command signal input into the second reception circuit 241 has been transmitted based on the initial communication setting, the second reception circuit 241 is able to receive the command signal.

Based on the initial communication setting stored in the initial communication setting storage 271, a second transmission circuit 242 of the standby-system communication circuit 240 transmits the command signal received by the second reception circuit 241 to the lower-level slave instrument through the lower-level interface 220. This operation corresponds to the operation of forwarding a command signal. It will be understood by those skill in the art that when the slave instrument 200 is the lowermost-level slave instrument (sensor 200-N), the second transmission circuit 242 transmits no command signal through the lower-level interface 220.

The second processor 253 processes an initialization command signal (second signal), among the command signals received by the second reception circuit 241. Specifically, when the second reception circuit 241 has received a second signal, the second processor 253 performs second processing, which corresponds to the second signal received by the second reception circuit 241. The second processor 253 may be a part of the processor 250 or a part of the standby-system communication circuit 240. The second processor 253 interprets the content of the command signal received by the second reception circuit 241 to determine whether this command signal is a processing target signal. When the second reception circuit 241 has received a command signal other than an initialization command, the second processor 253 may not necessarily perform processing corresponding to the command signal received by the second reception circuit 241 within a predetermined period of time. For example, the second processor 253 may disregard a command signal other than an initialization command signal. Alternatively, as processing corresponding to a command signal other than an initialization command signal, the first processor 251 may perform processing of canceling the command signal other than an initialization command signal. If the second processor 253 processes a command signal other than an initialization command signal, such a situation may result that both the first processor 251 and the second processor 253 can process the same command signal. In view of the circumstances, by causing the second processor 253 to disregard or cancel a command signal other than an initialization command signal, a processing collision between the first processor 251 and the second processor 253 is eliminated or minimized.

When the second reception circuit 241 has received an initialization command signal, the second processor 253 inputs, into the second changer 254, information indicating that initialization processing is to be performed according to the initialization command signal. Based on the information input from the second processor 253, a setting changer 254*a* of the second changer 254 changes the applied communication setting stored in the applied communication setting storage 261 by initializing the applied communication setting into the initial communication setting. After the second changer 254 has initialized the applied communication setting, the active-system communication circuit 230 (the first reception circuit 231 and the first transmission circuit 232) transmits and receives signals based on the initial communication setting. When there is a discrepancy of applied communication setting between the industrial instruments, the first changer 252 is unable to change the applied communication setting through the first reception circuit 231. Instead, the second changer 254 changes the applied communication setting through the second reception circuit 241. In this manner, identical communication settings are ensured between the industrial instruments.

(4) Operation Flow of Industrial Communication System

Figure 6:
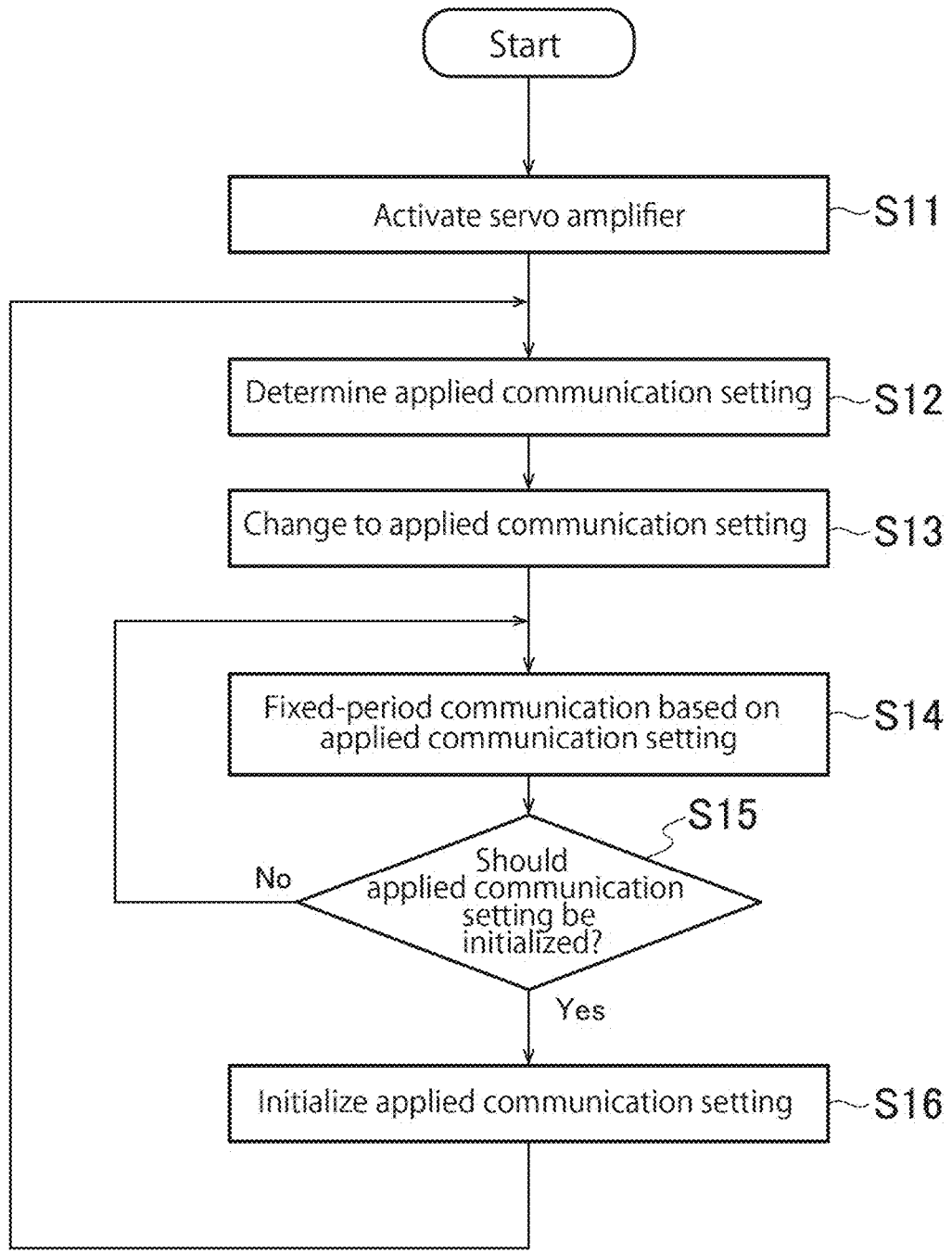
FIG. 6 is a flow chart of an operation of the master instrument (servo amplifier) according to the embodiment.

An operation flow of the industrial communication system 1 will be described.
(4.1) Operation Flow of Servo Amplifier
FIG. 6 is a flow chart of an operation of the servo amplifier 100.
As illustrated in FIG. 6, at step S11, power is introduced into the servo amplifier 100, activating the servo amplifier 100. Upon activation of the servo amplifier 100, the initial setting section 131 reads the initial communication setting from the initial communication setting storage 151, and writes the obtained initial communication setting in the applied communication setting storage 141.

At step S12, the applied communication setting determiner 132 determines an applied communication setting. Specifically, the applied communication setting determiner 132 causes the command generator 133 to generate a speed transmission command signal instructing transmission of the maximum communication speed of each reception circuit 122. The command transmitter 134 transmits, through the transmission circuit 121, the speed transmission command signal based on the initial communication setting. The response receiver 135 receives, through each reception circuit 122, a response signal including information of the maximum communication speed from the slave instrument 200 based on the initial communication setting. The applied communication setting determiner 132 grasps, based on the response signal from each slave instrument 200, the maximum communication speeds of the plurality of slave instruments 200. Then, the applied communication setting determiner 132 selects the lowest maximum communication speed from among the obtained maximum communication speeds, and determines, as the applied communication setting, a communication setting including the selected maximum communication speed.

At step S13, the command generator 133 generates a setting changing command signal instructing change to the applied communication setting determined by the applied communication setting determiner 132. The command transmitter 134 transmits, through the transmission circuit 121, the setting changing command signal based on the initial communication setting. The response receiver 135 receives, through the reception circuit 122, a response signal from each of the slave instruments 200 based on the initial communication setting. The response signal indicates change to the applied communication setting. The applied communication setting determiner 132 substitutes the initial communication setting stored in the applied communication setting storage 141 with the applied communication setting. In this manner, the applied communication setting determiner 132 changes the communication setting stored in the applied communication setting storage 141. The applied communication setting includes a communication speed setting higher than the communication speed setting of the initial communication setting.

At step S14, the command generator 133 periodically generates a detection-value transmission command signal instructing each of the slave instruments 200 to transmit a detection value obtained by the encoder and a detection value obtained by the sensor. The command transmitter 134 transmits, through the transmission circuit 121, the detection-value transmission command signal based on the applied communication setting. The response receiver 135 periodically receives, through the reception circuit 122, a response signal including the detection values from each of the slave instruments 200 based on the applied communication setting.

At step S14, the determiner 136 determines whether to initialize the applied communication setting or not. Specifically, the determiner 136 receives first response signals from the plurality of slave instruments 200 in a first period, and receives second response signals from the plurality of slave instruments 200 in a second period different from the first period. Then, based on the first response signals and the second response signals, the determiner 136 determines whether the number of slave instruments 200 communicable with the servo amplifier 100 has changed. When the determiner 136 has determined that the number of slave instruments 200 communicable with the servo amplifier 100 has changed, the determiner 136 determines that the applied communication setting should be initialized.

When the determiner 136 has determined that the applied communication setting should be initialized (step S15: Yes), then at step S16 the initial setting section 131 reads the initial communication setting from the initial communication setting storage 151, and writes the obtained initial communication setting in the applied communication setting storage 141. In this manner, the initial setting section 131 initializes the applied communication setting. The initial setting section 131 also causes the command generator 133 to generate an initialization command signal instructing initialization of the applied communication setting. The initialization command transmitter 134a of the command transmitter 134 transmits, through the transmission circuit 121, the initialization command signal based on the initial communication setting. The response receiver 135 receives, through the reception circuit 122, a response signal from each of the slave instruments 200 based on the initial communication setting. The response signal indicates that the applied communication setting has been initialized. After the applied communication setting has been initialized, the processing returns to step S12. Alternatively, after the applied communication setting has been initialized, the processing may return to step S13.

Figure 7:
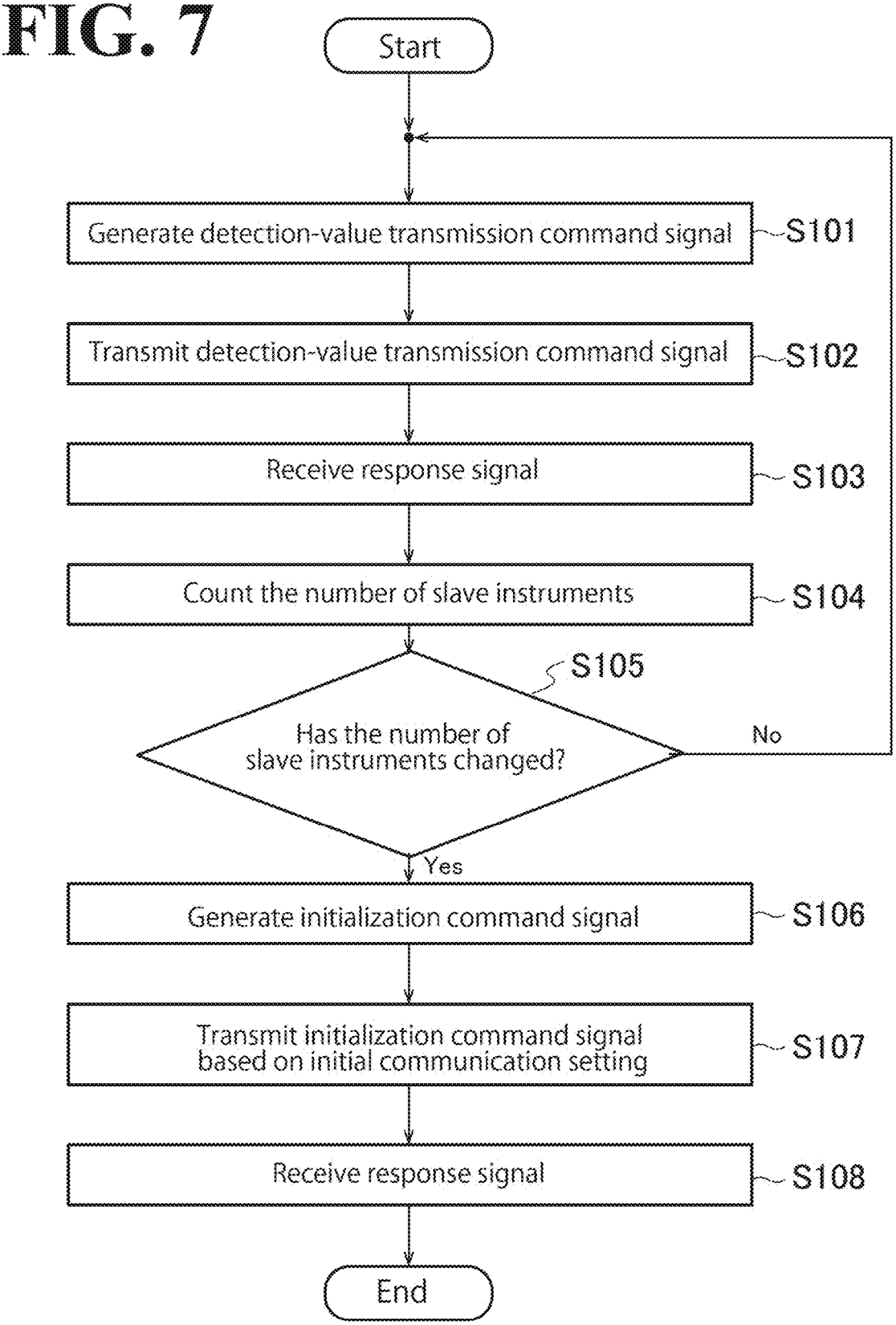
FIG. 7 is a flow chart illustrating specific examples of steps S14 to S16 illustrated in FIG. 6.

FIG. 7 is a flow chart illustrating specific examples of steps S14 to S16 illustrated in FIG. 6.

As illustrated in FIG. 7, at step S101, the command generator 133 generates a detection-value transmission command signal. Steps S101 to 105 may be performed in every communication period.

At step S102, the command transmitter 134 transmits, through the transmission circuit 121, a detection-value transmission command signal based on the applied communication setting. The detection-value transmission command signal is forwarded from the servo motor 200-1 toward the sensor 200-N based on the applied communication setting.

At step S103, the response receiver 135 receives, through the reception circuit 122, a response signal including detection values from each of the slave instruments 200 based on the applied communication setting.

At step S104, the determiner 136 counts the number of slave instruments 200 that transmitted response signals.

At step S105, the determiner 136 determines whether the current count has changed from the previous count. When the determiner 136 has determined that the current count remains unchanged from the previous count (step S105: No), the processing returns to step S101.

When the determiner 136 has determined that the current count has changed from the previous count (step S105: Yes), then at step S106 the command generator 133 generates an initialization command signal.

At step S107, the command transmitter 134 transmits, through the transmission circuit 121, the initialization command signal based on the initial communication setting. The initialization command signal is forwarded from the servo motor 200-1 toward the sensor 200-N based on the initial communication setting.

At step S108, the response receiver 135 receives, through the reception circuit 122, a response signal from each of the slave instruments 200 based on the initial communication setting.

(4.2) Operation Flow of Slave Instrument

Figure 8:
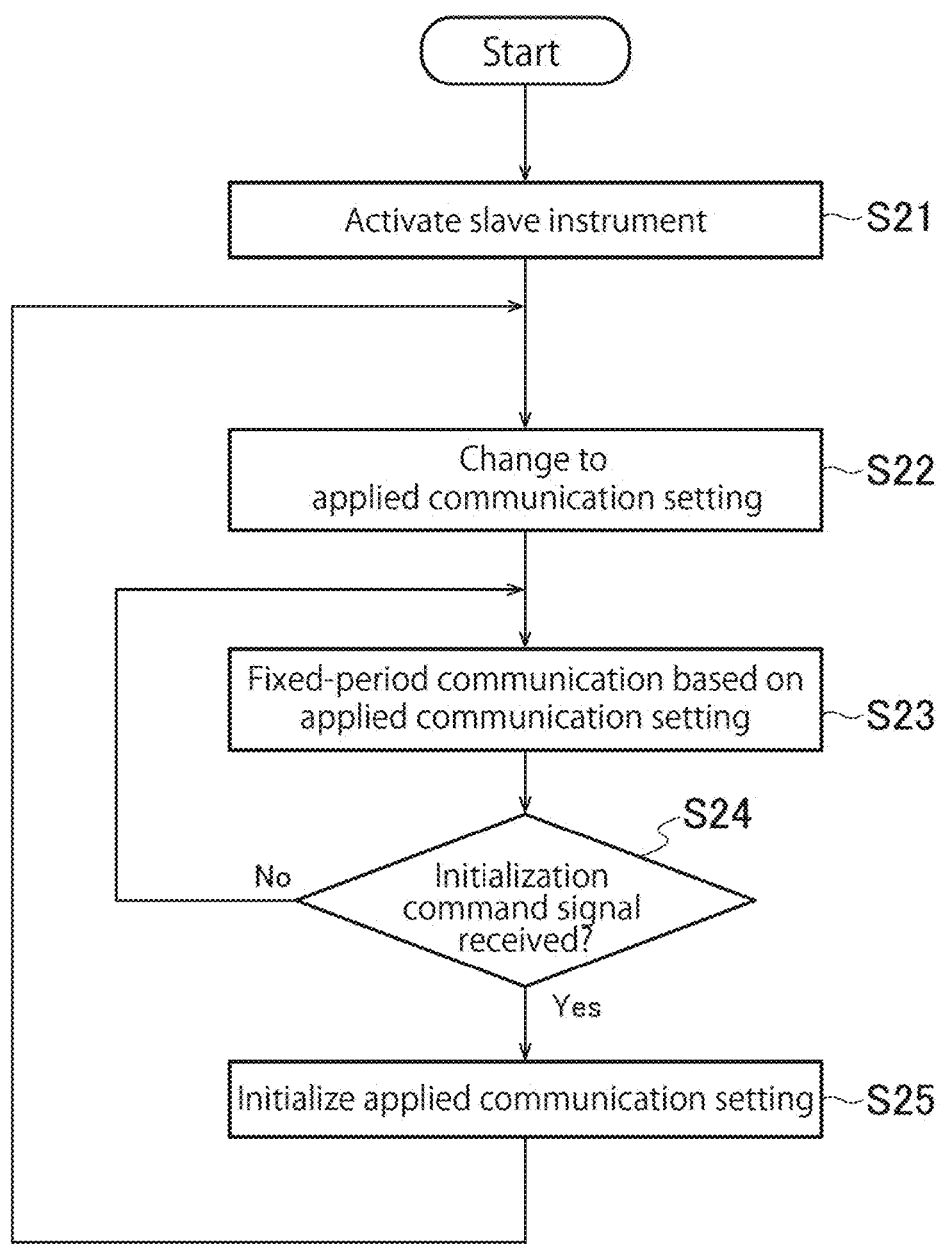
FIG. 8 is a flow chart of an operation of the slave instrument according to the embodiment.

FIG. 8 is a flow chart of an operation of the slave instrument 200. In FIG. 8, the sensor 200-2 illustrated in FIG. 1 is taken as an example. Also in FIG. 8, the processing of transmitting a response signal will not be elaborated upon.

As illustrated in FIG. 8, at step S21, power is introduced into the sensor 200-2, activating the sensor 200-2. Upon activation of the slave instrument 200, the initial setting section 256 reads the initial communication setting from the initial communication setting storage 271, and writes the obtained initial communication setting in the applied communication setting storage 261.

At step S22, the first reception circuit 231 receives, through the upper-level interface 210, a speed transmission command signal from the servo motor 200-1 based on the initial communication setting. The first transmission circuit 232 forwards, through the lower-level interface 220, the speed transmission command signal received by the first reception circuit 231 to the sensor 200-3 based on the initial communication setting. In response to the speed transmission command signal, the first processor 251 generates a response signal including information of the maximum communication speed of the sensor 200-2. The first transmission circuit 232 transmits, through the upper-level interface 210, the response signal generated by the first processor 251 based on the initial communication setting. Then, the first reception circuit 231 receives, through the upper-level interface 210, a setting changing command signal from the servo motor 200-1 based on the initial communication setting. The setting changing command signal instructs change to an applied communication setting determined by the servo amplifier 100. The first transmission circuit 232 forwards, through the lower-level interface 220, the setting changing command signal received by the first reception circuit 231 to the sensor 200-3 based on the initial communication setting. The first processor 251 inputs, into the first changer 252, information included in the setting changing command signal. Based on the information input from the first processor 251, the first changer 252 changes the communication setting stored in the applied communication setting storage 261. Specifically, the first changer 252 changes the communication setting from the initial communication setting to the communication setting designated by the setting changing command signal.

At step S23, the first reception circuit 231 receives, through the upper-level interface 210, a detection-value transmission command signal from the servo motor 200-1 based on the applied communication setting. The first transmission circuit 232 forwards, through the lower-level interface 220, the detection-value transmission command signal received by the first reception circuit 231 to the sensor 200-3 based on the applied communication setting. In response to the detection-value transmission command signal, the first processor 251 generates a response signal including detection values. The first transmission circuit 232 transmits, through the upper-level interface 210, the response signal generated by the first processor 251 based on the applied communication setting.

Then, when the second reception circuit 241 has received, through the upper-level interface 210, an initialization command signal based on the initial communication setting (step S24: Yes), then at step S25 the second processor 253 inputs, into the second changer 254, information indicating that initialization processing is to be performed according to the initialization command signal. Based on the information input from the second processor 253, the setting changer 254a of the second changer 254 changes the applied communication setting stored in the applied communication setting storage 261 by initializing the applied communication setting into the initial communication setting. After the applied communication setting has been initialized, the processing returns to step S22.

Figure 9:
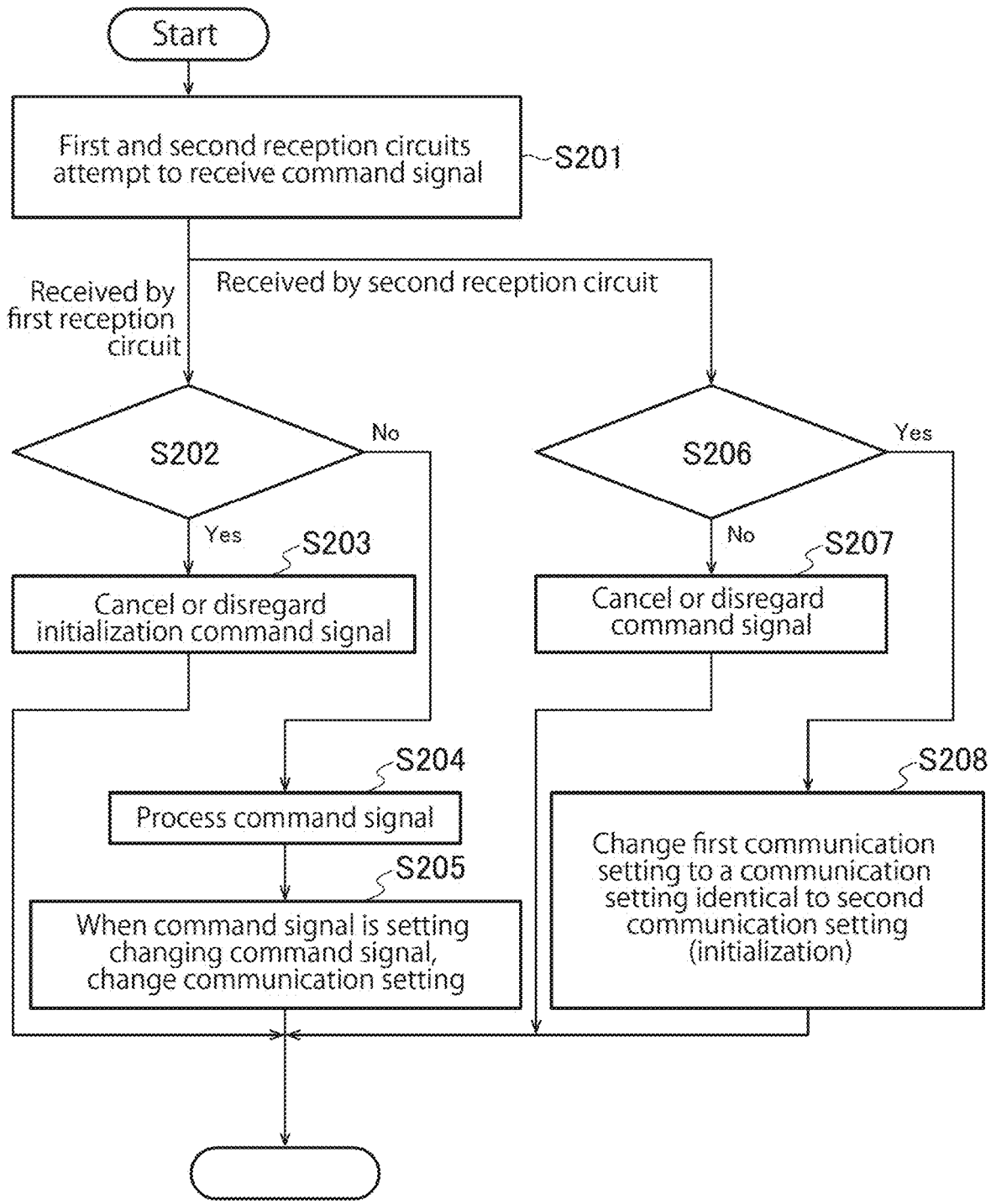
FIG. 9 is a flow chart illustrating specific examples of steps S22 to S25 illustrated in FIG. 8.

FIG. 9 is a flow chart illustrating specific examples of steps S22 to S25 illustrated in FIG. 8.

As illustrated in FIG. 9, at step S201, the first reception circuit 231 attempts to receive, based on the applied communication setting stored in the applied communication setting storage 261, a command signal input into the servo motor 200-2 from the servo motor 200-1 through the upper-level interface 210. When the command signal input into the first reception circuit 231 has been transmitted based on a communication setting identical to the communication setting stored in the applied communication setting storage 261, the first reception circuit 231 is able to receive the command signal. Also, the second reception circuit 241 attempts to receive, based on the initial communication setting stored in the initial communication setting storage 271, a command signal input into the servo motor 200-2 from the servo motor 200-1 through the upper-level interface 210. When the command signal input into the second reception circuit 241 has been transmitted based on a communication setting identical to the initial communication setting, the second reception circuit 241 is able to receive the command signal.

When the first reception circuit 231 has received the command signal, then at step S202 the first processor 251 determines whether the command signal received by the first reception circuit 231 is an initialization command signal. When the command signal received by the first reception circuit 231 is an initialization command signal (step S202: Yes), then at step S203 the first processor 251 cancels or disregards the initialization command signal received by the first reception circuit 231. When the command signal received by the first reception circuit 231 is not an initialization command signal (step S202: No), then at step S204 the first processor 251 performs processing corresponding to the received command signal. Also, the first processor 251 causes the command signal received by the first reception circuit 231 to be transmitted to the sensor 200-3 from the first transmission circuit 232 through the lower-level interface 220. When the command signal received by the first reception circuit 231 is a setting changing command signal, then at step S205 the first changer 252 changes the communication setting stored in the applied communication setting storage 261 to the communication setting (applied communication setting) designated by the setting changing command signal.

When the second reception circuit 241 has received the command signal, then at step S206 the second processor 253 determines whether the command signal received by the second reception circuit 241 is an initialization command signal. When the command signal received by the second reception circuit 241 is not an initialization command signal (step S206: No), then at step S207 the second processor 253 cancels or disregards the command signal received by the second reception circuit 241. When the command signal received by the second reception circuit 241 is an initialization command signal (step S206: Yes), then at step S208 the second changer 254 changes the applied communication setting stored in the applied communication setting storage 261 by initializing the applied communication setting into the initial communication setting stored in the initial communication setting storage 271. Also, the second processor 253 causes the initialization command signal received by the second reception circuit 241 to be transmitted to the sensor 200-3 from the second transmission circuit 242 through the lower-level interface 220.

(5) Outline of the Embodiment

In the industrial communication system 1, which includes a plurality of industrial instruments connected in series to each other, the slave instrument 200 includes the applied communication setting storage 261 (first storage), the first reception circuit 231, the initial communication setting storage 271 (second storage), and the second reception circuit 241. The applied communication setting storage 261 stores an applied communication setting applicable to communication established between the plurality of industrial instruments. Based on the applied communication setting (first communication setting) stored in the applied communication setting storage 261, the first reception circuit 231 receives a signal from an industrial instrument, among the plurality of industrial instruments, that is connected to the slave instrument 200. The initial communication setting storage 271 stores an initial communication setting (second communication setting). The initial communication setting is applicable to the communication established between the plurality of industrial instruments and is a predetermined communication setting common to the plurality of industrial instruments. The second reception circuit 241 receives, based on the initial communication setting stored in the initial communication setting storage 271, a signal including at least a part of the signal input into the first reception circuit 231.

When there is a discrepancy of applied communication setting between the slave instrument 200 and another industrial instrument, the first reception circuit 231 is unable to receive signals from the another industrial instrument. In contrast, the second reception circuit 241 is able to receive signals from the another industrial instrument based on the initial communication setting, which is a predetermined communication setting common to the plurality of industrial instruments. This enables the industrial instruments to communicate with each other with improved efficiency even in a situation in which different communication settings are used in the industrial instruments.

In this embodiment, the slave instrument 200 may include the first transmission circuit 232 and the second transmission circuit 242. Based on the applied communication setting stored in the applied communication setting storage 261, the first transmission circuit 232 transmits a signal including at least a part of the signal received by the first reception circuit 231 to the industrial instrument, among the plurality of industrial instruments, that is connected to the slave instrument 200. Based on the initial communication setting stored in the initial communication setting storage 271, the second transmission circuit 242 transmits a signal including at least a part of the signal received by the second reception circuit 241 to the industrial instrument, among the plurality of industrial instruments, that is connected to the slave instrument 200.

This configuration enables the slave instrument 200 to transmit a signal based on a communication setting identical to the communication setting that was used to receive this signal. As a result, the industrial instruments are able to transmit and receive signals to and from each other based on an identical communication setting.

In this embodiment, the slave instrument 200 may include the first changer 252 and the second changer 254. Based on a signal received by the first reception circuit 231, the first changer 252 changes the applied communication setting stored in the applied communication setting storage 261. Based on a signal received by the second reception circuit 241, the second changer 254 changes the applied communication setting stored in the applied communication setting storage 261.

When there is a discrepancy of applied communication setting between the industrial instruments, the first reception circuit 231 is unable to receive signals, making it impossible to change the applied communication setting through the first reception circuit 231. In this case, considering that the second reception circuit 241 is able to receive signals, the applied communication setting is changed through the second reception circuit 241. This ensures identical applied communication settings between the industrial instruments.

In this embodiment, the slave instrument 200 may include the first processor 251 and the second processor 253. When the first reception circuit 231 has received a first signal, the first processor 251 performs first processing corresponding to the first signal within a first predetermined period of time. When the second reception circuit 241 has received a second signal, the second processor 253 performs second processing corresponding to the second signal within a second predetermined period of time. When the second reception circuit 241 has received the first signal, the second processor 253 may not necessarily perform the first processing within the first predetermined period of time.

With this configuration, when the first reception circuit 231 has received the first signal, the first processor 251 performs the first processing within the first predetermined period of time. When the second reception circuit 241 has received the first signal, the second processor 253 does not perform the first processing within the first predetermined period of time. This eliminates or minimizes a processing collision (interference) that is otherwise caused to occur if both the first reception circuit 231 and the second reception circuit 241 receive the first signal and perform the same processings. Also, the configuration in which the second processor 253 does not perform the first processing makes the second processor 253 dedicated to processing other than the first processing. This configuration ensures that a lower throughput is required of the second processor 253, eliminating or minimizing an increase in cost and circuit size.

In this embodiment, when the first reception circuit 231 has received the second signal, the first processor 251 may not necessarily perform the second processing within the second predetermined period of time.

This configuration ensures that when the second reception circuit 241 has received the second signal, the second processor 253 performs the second processing within the second predetermined period of time. When the first reception circuit 231 has received the second signal, the first processor 251 does not perform the second processing within the second predetermined period of time. This configuration eliminates or minimizes a processing collision (interference) that is otherwise caused to occur if both the first reception circuit 231 and the second reception circuit 241 receive the second signal and perform the same processings. Also, the configuration in which the first processor 251 does not perform the second processing makes the first processor 251 dedicated to processing other than the second processing. This configuration ensures that a lower throughput is required of the first processor 251, eliminating or minimizing an increase in cost and circuit size.

In this embodiment, when the first reception circuit 231 and the second reception circuit 241 have received identical signals, the first processor 251 and the second processor 253 may perform processings different from each other.

When the applied communication setting and the initial communication setting are identical communication settings, it is possible for the first reception circuit 231 and the second reception circuit 241 to receive identical signals. In this case, the first processor 251 and the second processor 253 perform processings different from each other. This eliminates or minimizes a processing collision (interference) that is otherwise caused to occur if the first processor 251 and the second processor 253 perform the same processings.

In this embodiment, the initial communication setting stored in the slave instrument 200 may be a communication setting automatically set upon activation of the slave instrument 200.

Thus, the initial communication setting is a communication setting automatically set upon activation of the slave instrument 200, that is, a default communication setting (initial communication setting). Use of the default communication setting as the initial communication setting ensures that the initial communication setting is common to the plurality of industrial instruments. Also, use of the default communication setting as the initial communication setting is labor saving for a user as compared with the case where the user sets an initial communication setting for each individual industrial instrument.

In this embodiment, the slave instrument 200 may include the nonvolatile memory 270, and the initial communication setting storage 271 may be located in the nonvolatile memory 270.

This configuration ensures that even if power of the slave instrument 200 is turned off, the initial communication setting storage 271 holds the initial communication setting, ensuring that the initial communication setting is common to the plurality of industrial instruments.

In this embodiment, the applied communication setting may have a first communication speed setting, and the initial communication setting may have a second communication speed setting. The first communication speed setting may be higher than the second communication speed setting.

This configuration ensures that a communication setting having a communication speed setting higher than the communication speed setting of the initial communication setting is used as the applied communication setting. This ensures that the communication speed of communication established based on the applied communication setting is higher than the communication speed of communication established based on the initial communication setting. Also, the initial communication setting, which is common to the plurality of industrial instruments, enables the industrial instruments to communicate with each other with improved efficiency, ensuring a sufficient level of communication continuity. Thus, the applied communication setting and the initial communication setting are used interchangeably in communication. This ensures a sufficient level of communication continuity while dealing with demands for increase in communication speed.

In this embodiment, the industrial communication system 1 includes the servo amplifiers 100. Each of the servo amplifiers 100 controls a plurality of industrial instruments. The plurality of industrial instruments include a plurality of slave instruments 200. Each of the slave instruments 200 is controlled by a command signal periodically transmitted by the servo amplifier 100, and transmits a response signal in response to the command signal. Each servo amplifier 100 may include the determiner 136. The determiner 136 receives first response signals from the plurality of slave instruments 200 in a first period, and receives second response signals from the plurality of slave instruments 200 in a second period different from the first period. Then, based on the first response signals and the second response signals, the determiner 136 determines whether the number of slave instruments 200 communicable with the servo amplifier 100 has changed.

When the number of slave instruments 200 communicable with the servo amplifier 100 has changed, there is a possibility of discrepancy of communication setting (applied communication setting) between the industrial instruments. The servo amplifier 100 receives first response signals from the plurality of slave instruments 200 in a first period, and receives second response signals from the plurality of slave instruments 200 in a second period different from the first period. Then, based on the first response signals and the second response signals, the servo amplifier 100 determines whether the number of slave instruments 200 communicable with the servo amplifier 100 has changed. This enables the servo amplifier 100 to take a suitable measure when the number of slave instruments 200 communicable with the servo amplifier 100 has changed.

In this embodiment, the servo amplifier 100 may include the command transmitter 134. When the determiner 136 has determined that the number of slave instruments 200 communicable with the servo amplifier 100 has changed, the command transmitter 134 transmits a command signal based on the initial communication setting.

With this configuration, when the determiner 136 has determined that the number of slave instruments 200 communicable with the servo amplifier 100 has changed, that is, when there is a possibility of discrepancy of communication setting (applied communication setting) between the industrial instruments, the command transmitter 134 transmits a command signal based on the initial communication setting. This enables the communication between the servo amplifier 100 and the plurality of slave instruments 200 to resume or continue.

In this embodiment, the command transmitter 134 may include a predetermined command transmitter 134a. When the determiner 136 has determined that the number of slave instruments 200 communicable with the servo amplifier 100 has changed, the predetermined command transmitter 134*a* transmits a predetermined command signal based on the initial communication setting. The predetermined command signal causes the applied communication setting to be changed. The slave instrument 200 receiving the predetermined command signal may include the setting changer 254*a*. The setting changer 254*a* changes, based on the predetermined command signal, the applied communication setting stored in the applied communication setting storage 261 of the slave instrument 200.

With this configuration, when there is a possibility of discrepancy of communication setting (applied communication setting) between the industrial instruments, the predetermined command transmitter 134*a* of the servo amplifier 100 transmits, based on the initial communication setting, a command signal instructing change of the applied communication setting. This ensures identical applied communication settings between the industrial instruments.

(6) First Modification

In the above-described embodiment, the initialization processing is performed when the determiner 136 has determined that the number of slave instruments 200 communicable with the servo amplifier 100 has changed. In addition to or instead of the determination made by the determiner 136, an input operation made by a user may be used as a basis of the initialization processing. For example, the servo amplifier 100 may be provided with an operation terminal, and the initial setting section 131 may perform the initialization processing upon detection of handling of a predetermined switch on the operation terminal. The predetermined switch may be an initialization switch that receives an initialization instructing operation. Alternatively, the predetermined switch may be a recovery switch or a mode switch that receives a recovery instructing operation instructing recovery from maintenance-inspection mode, in which communication within the industrial communication system 1 is stopped.

(7) Second Modification

In the above-described embodiment, the signal to be processed by the first processor 251 and the signal to be processed by the second processor 253 are different from each other. This keeps the first processor 251 and the second processor 253 from performing identical processings when the applied communication setting and the initial communication setting are identical communication settings.

Figure 10:
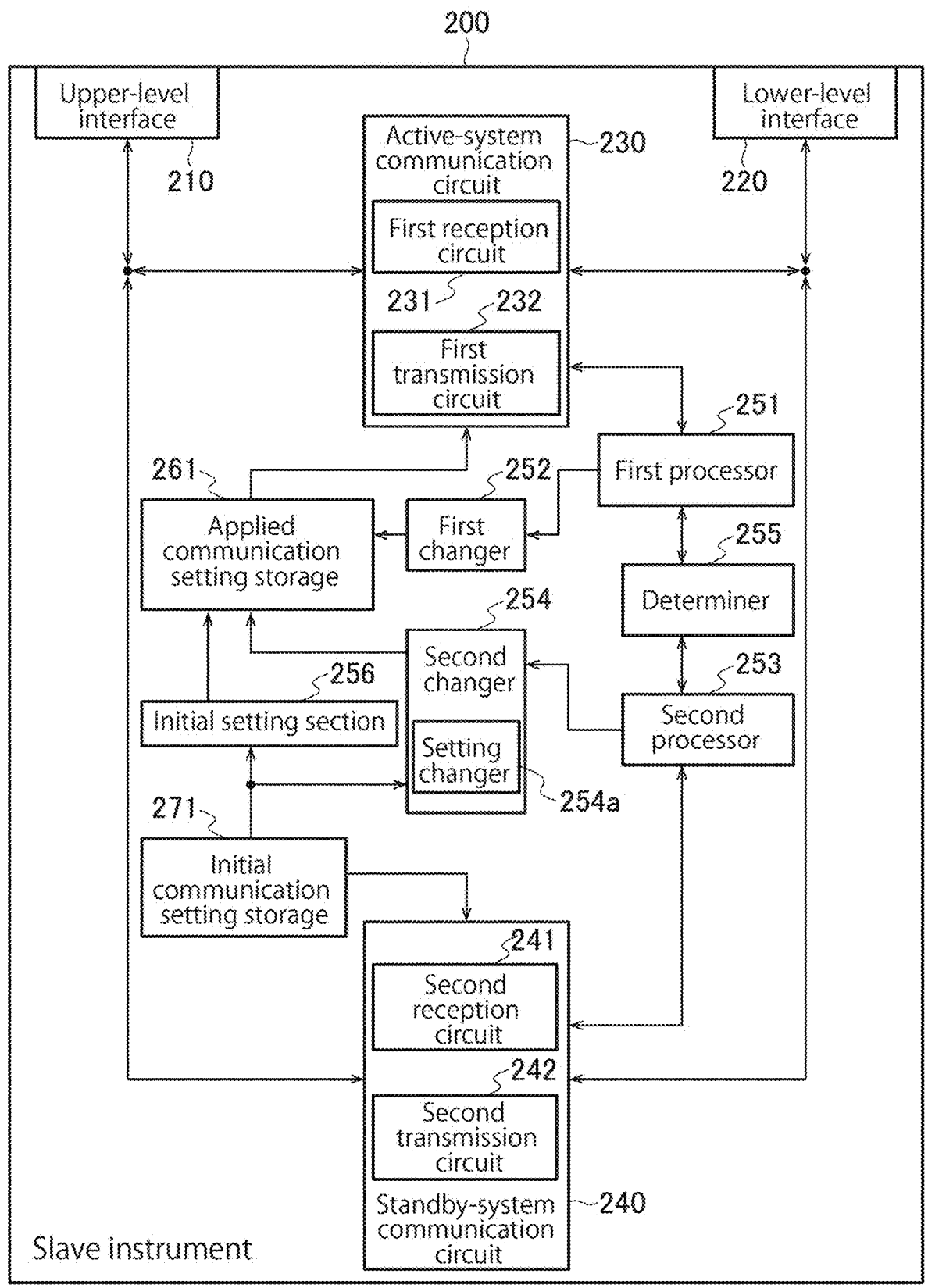
FIG. 10 is a diagram illustrating a functional block configuration of a slave instrument according to a second modification of the embodiment.

In a second modification, when the applied communication setting and the initial communication setting are identical communication settings, either the processing performed by the first processor 251 or the processing performed by the second processor 253 is stopped. FIG. 10 is a diagram illustrating a functional block configuration of a slave instrument 200 according to the second modification. As illustrated in FIG. 10, the slave instrument 200 according to the second modification includes a determiner 255. When the applied communication setting and the initial communication setting are identical communication settings, the determiner 255 determines whether the first processor 251 performs the processing corresponding to the signal received by the first reception circuit 231 or the second processor 253 performs the processing corresponding to the signal received by the second reception circuit 241.

The determiner 255 monitors the applied communication setting stored in the applied communication setting storage 261 and the initial communication setting stored in the initial communication setting storage 271. When the applied communication setting and the initial communication setting are identical communication settings, the determiner 255 causes the second processor 253 to stop operation so that the first processor 251, instead of the second processor 253, performs its processing. Alternatively, when the applied communication setting and the initial communication setting are identical communication settings, the determiner 255 causes the first processor 251 to stop operation so that the second processor 253, instead of the first processor 251, performs its processing. This keeps the first processor 251 and the second processor 253 from performing identical processings when the applied communication setting and the initial communication setting are identical communication settings. As a result, a processing collision (interference) that is otherwise caused to occur if the first processor 251 and the second processor 253 perform identical processings is eliminated or minimized.

(8) Third Modification

In the above-described embodiment, the second changer 254 changes the applied communication setting stored in the applied communication setting storage 261 by initializing the applied communication setting into the initial communication setting stored in the initial communication setting storage 271. It is also possible for the second changer 254 to change the applied communication setting stored in the applied communication setting storage 261 to a communication setting different from the initial communication setting stored in the initial communication setting storage 271.

In a third modification, the second changer 254 changes the applied communication setting stored in the applied communication setting storage 261 to a communication setting having a communication speed setting higher than the communication speed setting of the initial communication setting stored in the initial communication setting storage 271. For example, assume that the communication speed setting of the initial communication setting stored in the initial communication setting storage 271 is V1 (for example, 4 [MHz]). In this case, the second changer 254 changes the applied communication setting stored in the applied communication setting storage 261 to a communication setting having a communication speed setting of V2 (for example, 8 [MHz]), which is higher than the communication speed setting of the initial communication setting stored in the initial communication setting storage 271.

This increases the speed of communication established between the industrial instruments based on the post-change applied communication setting as compared with the case where the applied communication setting stored in the applied communication setting storage 261 is changed to a communication setting having a communication speed setting equal to or lower than the communication speed setting of the initial communication setting stored in the initial communication setting storage 271.

(9) Other Embodiments

Other embodiments will be described.

In the above-described embodiment, the servo amplifier 100 includes a single communication circuit (the communication circuit 120), and the slave instrument 200 includes two communication circuits (the active-system communication circuit 230 and the standby-system communication circuit 240). In another possible embodiment, the servo amplifier 100 may include two communication circuits, similarly to the slave instrument 200.

In the above-described embodiment, baseband transmission is used to transmit and receive digital signals on wired transmission paths (the signal lines 10). In another possible embodiment, broadband transmission may be used, instead of baseband transmission. With broadband transmission, a digital signal is transmitted in the form of a carrier (carrier wave). Broadband transmission enables a plurality of signals to be multiplexed by frequency division using different carrier frequencies. In this case, the industrial instruments transmit and receive multiplexed signals, which are a multiplex of a plurality of signals, on the wired transmission paths (the signal lines 10). In this configuration, the first communication setting has a first carrier frequency setting, and the second communication setting has a second carrier frequency setting. Based on the first carrier frequency setting, the first reception circuit 231 demodulates a signal transmitted on the first carrier frequency. Specifically, the first reception circuit 231 performs filter processing to extract, from multiplexed signals, a signal having a first carrier frequency component, and demodulates the signal having the first carrier frequency component. Based on the second carrier frequency setting, the second reception circuit 241 demodulates a signal transmitted on the second carrier frequency. Specifically, the second reception circuit 241 performs filter processing to extract, from the multiplexed signals, a signal having a second carrier frequency component, and demodulates the signal having the second carrier frequency component. This enables the first reception circuit 231 and the second reception circuit 241 to receive, in a parallel manner, a plurality of signals multiplexed by frequency division multiplex, resulting in an increase in communication speed.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. An industrial communication system, comprising:
a plurality of industrial instruments connected in series and including a first industrial instrument and a second industrial instrument connected to the first industrial instrument, wherein the first industrial instrument comprises
a first storage configured to store a first communication setting that is applicable to communication established between the industrial instruments,
first reception circuitry configured to receive, based on the first communication setting stored in the first storage, a first signal from the second industrial instrument of the industrial instruments,
a second storage configured to store a second communication setting that is applicable to the communication established between the industrial instruments and that is a predetermined communication setting common to each of the industrial instruments,
second reception circuitry configured to receive, based on the second communication setting stored in the second storage, a second signal including at least a part of the first signal received by the first reception circuitry, and
first processing circuitry and second processing circuitry configured to perform different processes from each other when the first reception circuitry and the second reception circuitry receive identical signals.

2. The industrial communication system according to claim 1, wherein the first industrial instrument further includes first transmission circuitry configured to transmit, based on the first communication setting stored in the first storage, the second signal, including at least the part of the first signal received by the first reception circuitry, to the second industrial instrument, and second transmission circuitry configured to transmit, based on the second communication setting stored in the second storage, a third signal, including at least a part of the first signal received by the second reception circuitry, to the second industrial instrument.

3. The industrial communication system according to claim 2, wherein the first processing circuitry is configured to change, based on the first signal received by the first reception circuitry, the first communication setting stored in the first storage, and the second processing circuitry is configured to change, based on the second signal received by the second reception circuitry, the first communication setting stored in the first storage.

4. The industrial communication system according to claim 2, wherein the first processing circuitry is configured to, when the first reception circuitry has received a fourth signal, perform first processing corresponding to the fourth signal within a first predetermined period of time, and the second processing circuitry is configured to, when the second reception circuitry has received a fifth signal different from the fourth signal, perform second processing corresponding to the fifth signal within a second predetermined period of time, and when the second reception circuitry has received the fourth signal, the second processing circuitry does not perform the first processing within the first predetermined period of time.

5. The industrial communication system according to claim 1, wherein the first processing circuitry is configured to change, based on the first signal received by the first reception circuitry, the first communication setting stored in the first storage, and the second processing circuitry is configured to change, based on the second signal received by the second reception circuitry, the first communication setting stored in the first storage.

6. The industrial communication system according to claim 5, wherein the first processing circuitry is configured to, when the first reception circuitry has received a third signal, perform first processing corresponding to the third signal within a first predetermined period of time, and the second processing circuitry is configured to, when the second reception circuitry has received a fourth signal different from the third signal, perform second processing corresponding to the fourth signal within a second predetermined period of time, and when the second reception circuitry has received the third signal, the second processing circuitry does not perform the first processing within the first predetermined period of time.

7. The industrial communication system according to claim 1, wherein the first processing circuitry is configured to perform, when the first reception circuitry has received a third signal, first processing corresponding to the third signal within a first predetermined period of time, and the second processing circuitry is configured to perform, when the second reception circuitry-has received a fourth signal different from the third signal, second processing corresponding to the fourth signal within a second predetermined period of time, and when the second reception circuitry has received the third signal, the second processing circuitry does not perform the first processing within the first predetermined period of time.

8. The industrial communication system according to claim 1, wherein the first processing circuitry is configured to perform, when the first reception circuitry has received a third signal, first processing corresponding to the third signal within a first predetermined period of time, and the second processing circuitry is configured to perform, when the second reception circuitry has received a fourth signal different from the third signal, second processing corresponding to the fourth signal within a second predetermined period of time, and when the first reception circuitry has received the fourth signal, the first processing circuitry does not perform the second processing within the second predetermined period of time.

9. The industrial communication system according to claim 1, wherein the first processing circuitry is configured to, when the first reception circuitry has received a third signal, perform first processing corresponding to the third signal within a first predetermined period of time, and the second processing circuitry is configured to, when the second reception circuitry has received a fourth signal different from the third signal, perform second processing corresponding to the fourth signal within a second predetermined period of time.

10. The industrial communication system according to claim 1, wherein the second communication setting stored in the first industrial instrument includes a communication setting automatically set upon activation of the first industrial instrument.

11. The industrial communication system according to claim 1, wherein the first industrial instrument includes a nonvolatile memory, and the second storage is located in the nonvolatile memory.

12. The industrial communication system according to claim 1, wherein the first communication setting includes a first communication speed setting, and the second communication setting includes a second communication speed setting, the first communication speed setting being a higher speed than the second communication speed setting.

13. The industrial communication system according to claim 1, further comprising:
a master instrument configured to control the industrial instruments,
wherein the industrial instruments includes a plurality of slave instruments such that each of the slave instruments is controllable by a command signal periodically transmitted from the master instrument and is configured to transmit a response signal to the master instrument in response to the command signal, and the master instrument includes circuitry configured to receive first response signals from the plurality of slave instruments in a first period, receive second response signals from the plurality of slave instruments in a second period different from the first period, and based on the first response signals and the second response signals, determine whether a number of the slave instruments that are communicable with the master instrument has changed.

14. The industrial communication system according to claim 13, wherein the master instrument further includes a command transmitter configured to, when the circuitry has determined that the number of the slave instruments that are communicable with the master instrument has changed, transmit the command signal based on the second communication setting.

15. The industrial communication system according to claim 14, wherein the command transmitter is further configured to, when the circuitry has determined that the number of the slave instruments communicable with the master instrument has changed, transmit a predetermined command signal to a slave instrument of the plurality of slave instruments based on the second communication setting to cause the slave instrument to change the first communication setting, and the slave instrument receiving the predetermined command signal includes processing circuitry configured to change, based on the predetermined command signal, the first communication setting stored in a first storage of the slave instrument.

16. The industrial communication system according to claim 1, wherein the first processing circuitry is configured to, when the first reception circuitry has received a third signal, perform first processing corresponding to the first signal received by the first reception circuitry, and the second processing circuitry is configured to, when the second reception circuitry has received a fourth signal, perform second processing corresponding to the fourth signal received by the second reception circuitry, and the first industrial instrument further includes third processing circuitry configured to, when the first communication setting and the second communication setting are identical communication settings, determine whether the first processing circuitry performs the first processing corresponding to the third signal received by the first reception circuitry or the second processing circuitry performs the second processing corresponding to the fourth signal received by the second reception circuitry.

17. An industrial instrument of a plurality of industrial instruments connected in series, comprising:
a first storage configured to store a first communication setting that is applicable to communication established between the industrial instruments;
first reception circuitry configured to receive, based on the first communication setting stored in the first storage, a first signal from a second industrial instrument of the industrial instruments that is connected to the industrial instrument;
a second storage configured to store a second communication setting that is applicable to the communication established between the industrial instruments and that is a predetermined communication setting common to each of the industrial instruments;
second reception circuitry configured to receive, based on the second communication setting stored in the second storage, a second signal comprising at least a part of the first signal received by the first reception circuitry; and
first processing circuitry and second processing circuitry configured to perform different processes from each other; when the first reception circuitry and the second reception circuitry receive identical signals.

18. The industrial instrument according to claim 17, wherein the first processing circuitry is configured to, when the first reception circuitry has received a third signal, perform first processing corresponding to the third signal within a first predetermined period of time, and the second processing circuitry is configured to, when the second reception circuitry has received a fourth signal different from the third signal, perform second processing corresponding to the fourth signal within a second predetermined period of time, and when the second reception circuitry has received the third signal, the second processing circuitry does not perform the first processing within the first predetermined period of time.

19. An industrial communication method for a first industrial instrument of a plurality of industrial instruments connected in series, comprising:

storing a first communication setting that is applicable to communication established between the industrial instruments;

storing a second communication setting that is applicable to the communication established between the industrial instruments and that is a predetermined communication setting common to each of the industrial instruments;

controlling first reception circuitry located in the first industrial instrument to receive, based on the first communication setting, a first signal from a second industrial instrument that is connected to the first industrial instrument;

controlling second reception circuitry located in the first industrial instrument to receive, based on the second communication setting, a second signal including at least a part of the first signal received by the first reception circuitry; and controlling first processing circuitry and second processing circuitry to perform different processes from each other when the first reception circuitry and the second reception circuitry receive identical signals.

20. The industrial instrument according to claim 17, wherein the first processing circuitry is configured to, when the first reception circuitry has received a third signal, perform first processing corresponding to the third signal within a first predetermined period of time, and the second processing circuitry is configured to, when the second reception circuitry has received a fourth signal different from the third signal, perform second processing corresponding to the fourth signal within a second predetermined period of time, and when the first reception circuitry has received the fourth signal, the first processing circuitry does not perform the second processing within the second predetermined period of time.

* * * * *

UNITED STATES PATENT AND TRADEMARK OFFICE
CERTIFICATE OF CORRECTION

PATENT NO. : 10,852,713 B2
APPLICATION NO. : 16/118499
DATED : December 1, 2020
INVENTOR(S) : Hidetsugu Koga et al.

It is certified that error appears in the above-identified patent and that said Letters Patent is hereby corrected as shown below:

On the Title Page

Item (73) should read:
--(73) Assignee: KABUSHIKI KAISHA YASKAWA DENKI, Kitakyushu (JP)--

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*